(12) United States Patent
Jin et al.

(10) Patent No.: US 9,614,452 B2
(45) Date of Patent: Apr. 4, 2017

(54) LED DRIVING ARRANGEMENT WITH REDUCED CURRENT SPIKE

(71) Applicant: Microsemi Corporation, Aliso Viejo, CA (US)

(72) Inventors: Xiaoping Jin, Orange, CA (US); Juan R Cendejas, Los Angeles, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 15/079,093

(22) Filed: Mar. 24, 2016

(65) Prior Publication Data

US 2016/0205736 A1 Jul. 14, 2016

Related U.S. Application Data

(63) Continuation-in-part of application No. 14/559,135, filed on Dec. 3, 2014, now Pat. No. 9,490,718, which
(Continued)

(51) Int. Cl.
*H05B 37/02* (2006.01)
*H02M 3/335* (2006.01)
*H05B 33/08* (2006.01)

(52) U.S. Cl.
CPC .... *H02M 3/33561* (2013.01); *H05B 33/0815* (2013.01); *H05B 33/0827* (2013.01)

(58) Field of Classification Search
CPC .. H05B 41/28; H05B 41/295; H05B 41/2827; H05B 41/3925; H05B 41/042;
(Continued)

(56) References Cited

U.S. PATENT DOCUMENTS 4,562,338 A 12/1985 Okami
6,075,295 A 6/2000 Li
(Continued)

FOREIGN PATENT DOCUMENTS

EP 0587923 A1 3/1994
EP 2262086 A1 12/2010
(Continued)

OTHER PUBLICATIONS

Office Action of Jul. 14, 2016 for U.S. Appl. No. 14/559,135.
(Continued)

*Primary Examiner* — Minh D A
(74) *Attorney, Agent, or Firm* — Simon Kahn

(57) ABSTRACT

A LED driving arrangement constituted of: a control circuitry; an inductance element having a primary side and a secondary side; the inductance element arranged, responsive to a switching circuit, to receive power at the primary side from a power source, and the inductance element further arranged, responsive to the received power at the primary side, to output at the secondary side a function of the received power; at least LED based luminaire; a parasitic capacitance between the at least one LED based luminaire and a chassis; and an electronically controlled switch coupled between the secondary side of the inductance element and the at least one LED based luminaire, wherein the electronically controlled switch and the secondary side of the inductance element and a discharge path of the parasitic capacitance are coupled in series.

12 Claims, 23 Drawing Sheets

Related U.S. Application Data is a continuation-in-part of application No. 14/296,544, filed on Jun. 5, 2014, now Pat. No. 9,018,852, which is a continuation of application No. 13/279,445, filed on Oct. 24, 2011, now Pat. No. 8,779,686.

(60) Provisional application No. 61/406,136, filed on Oct. 24, 2010, provisional application No. 61/910,975, filed on Dec. 3, 2013, provisional application No. 62/137,377, filed on Mar. 24, 2015.

(58) Field of Classification Search
CPC .............. H05B 41/2822; H05B 41/282; H05B 41/2325; H05B 41/2856; Y02B 20/202; Y02B 20/204; H01F 38/10
USPC ........ 315/200 R, 209 R, 291, 276, 272, 268, 315/244, 274
See application file for complete search history.

(56) References Cited

U.S. PATENT DOCUMENTS

| | | | |
|---|---|---|---|
| 6,297,970 | B2 | 10/2001 | Hemena et al. |
| 6,459,595 | B2 | 10/2002 | Assow |
| 7,411,358 | B2 | 8/2008 | Shimura et al. |
| 7,679,937 | B2 | 3/2010 | Wingrove et al. |
| 7,923,943 | B2 | 4/2011 | Peker et al. |
| 9,490,718 | B2 * | 11/2016 | Jin ..................... H05B 33/0815 |
| 2003/0001524 | A1 | 1/2003 | Lin et al. |
| 2004/0135562 | A1 | 7/2004 | Oden |
| 2004/0251854 | A1 | 12/2004 | Matsuda et al. |
| 2005/0093471 | A1 | 5/2005 | Jin |
| 2005/0093472 | A1 | 5/2005 | Jin |
| 2005/0179393 | A1 | 8/2005 | Marakami et al. |
| 2005/0225261 | A1 | 10/2005 | Jin |
| 2005/0264271 | A1 | 12/2005 | Lam et al. |
| 2007/0013321 | A1 | 1/2007 | Ito et al. |
| 2008/0116818 | A1 | 5/2008 | Shteynberg et al. |
| 2008/0272743 | A1 | 11/2008 | Ackermann et al. |
| 2009/0009088 | A1 | 1/2009 | Ito et al. |
| 2009/0195174 | A1 | 8/2009 | Jin |
| 2009/0195175 | A1 | 8/2009 | Jin |
| 2009/0195178 | A1 | 8/2009 | Jin |
| 2009/0295776 | A1 * | 12/2009 | Yu ..................... H05B 33/0818 345/212 |
| 2010/0019692 | A1 | 1/2010 | Kimura |
| 2010/0019696 | A1 | 1/2010 | Kimura |
| 2010/0052568 | A1 | 3/2010 | Cohen |
| 2010/0090607 | A1 | 4/2010 | Vos |
| 2010/0164403 | A1 | 7/2010 | Liu |
| 2010/0237786 | A1 | 9/2010 | Santo et al. |
| 2010/0237802 | A1 | 9/2010 | Aso |
| 2010/0253302 | A1 | 10/2010 | Otte et al. |
| 2010/0283322 | A1 | 11/2010 | Wibben |
| 2011/0062889 | A1 | 3/2011 | Hoogzaad et al. |
| 2011/0068700 | A1 | 3/2011 | Fan |
| 2011/0310639 | A1 | 12/2011 | Hsu |
| 2012/0013259 | A1 | 1/2012 | Jin |
| 2012/0286576 | A1 | 11/2012 | Jing et al. |

FOREIGN PATENT DOCUMENTS

| | | |
|---|---|---|
| IN | 964/KOL/2009 | 1/2011 |
| KR | 2008-0073173 A | 8/2008 |
| WO | 96/38024 A1 | 11/1996 |

OTHER PUBLICATIONS

Ma, Ki, Tsui and Mok; "Single-Inductor Multiple-Output Switching Converters With Time-Multiplexing Control in Discontinuous Conduction Mode"; IEEE Journal of Solid State Circuits, vol. 28, No. 1, Jan. 2003; IEEE, New York.

Ki and Ma; "Single-Inductor Multiple-Output Switching Converters"; Power Electronics Specialists Conference, 2001, pp. 226-231; published 2001 by IEEE, New York.

European Power Supply Manufacturers Association, "Harmonic Current Emissions" dated Nov. 2010; published at www.epsma.org.

Havanur, S.; "Combining Synchronous Rectification and Post Regulation for Multiple Isolated Outputs"; Applied Sower Electronics Conference and Exposition, 2004; vol. 2, pp. 872-877; published 2004 by IEEE, New York.

Williams, B.W.; "Power Electronics Devices, Drivers, Applications and Passive Components"; Second Edition, McGraw-Hill, 1992; Chapter 10, pp. 218-249.

Bradley, D.A., "Power Electronics" 2nd Edition; Chapman & Hall, 1995; Chapter 1, pp. 1-38.

Dubey, G. K., "Thyristorised Power Controllers"; Halsted Press, 1986; pp. 74-77.

* cited by examiner

LED DRIVING ARRANGEMENT WITH REDUCED CURRENT SPIKE

CROSS-REFERENCE TO RELATED APPLICATIONS

The present application is a continuation-in-part of U.S. patent application Ser. No. 14/559,135, filed Dec. 3, 2014 and titled "MULTIPLE OUTPUT SYNCHRONOUS POWER CONVERTER", which is a continuation-in-part of U.S. patent application Ser. No. 14/296,544, filed Jun. 5, 2014 and titled "SYNCHRONOUS REGULATION FOR LED STRING DRIVER", which is a continuation of U.S. patent application Ser. No. 13/279,445, filed Oct. 24, 2011 and titled "SYNCHRONOUS REGULATION FOR LED STRING DRIVER", which claims priority from U.S. provisional patent application 61/406,136, filed Oct. 24, 2010 and titled "SYNCHRONOUS REGULATION FOR LED STRING DRIVER". U.S. patent application Ser. No. 14/559,135 further claims priority from U.S. provisional application 61/910,975, filed Dec. 3, 2013 and titled "MULTIPLE OUTPUT SYNCHRONOUS POWER CONVERTER". The present application further claims priority from U.S. provisional patent application 62/137,377, filed Mar. 24, 2015 and titled "SYNCHRONOUSLY REGULATED LED DRIVE METHOD". The entire contents of all of the above documents are incorporated herein by reference.

TECHNICAL FIELD

The present invention relates to the field of LED driving arrangement, and in particular to an LED driving arrangement with spike suppression.

BACKGROUND OF THE INVENTION

In liquid crystal display (LCD) TVs the power system needs to supply DC voltages for the electronic circuitry of the TV and further provide a controllable power to drive the light emitting diode (LED) backlight unit. A popular architecture presently used is to supply both the DC voltage and the LED power from a single power transformer, thus saving the cost of additional power transformers and the associated primary side drive stage. In such an approach the primary side power stage control is usually utilized to provide regulation for the main DC output voltage. In such an architecture, since the power supplied to the LED drive stage is thus not well regulated, a separate LED drive circuit has to be deployed to control the LED current as well as any dimming operation. A technique has been developed to drive the LED string(s) with a switching device with its one switching edge synchronized with the primary side switching action and regulate the LED current by modulating its conduction pulse width, as described in U.S. Pat. No. 8,779,686 issued Jul. 15, 2014 to Jin, to which the present application claims priority, the entire contents of which is incorporated herein by reference.

FIGS. 1 and 2 herein illustrate typical circuit examples of such a technique, with FIG. 1 showing an application example with a fly back topology on the primary side, and FIG. 2 showing a half bridge LLC topology on the primary side. In the example circuits illustrated in FIGS. 1 and 2, the energy storage capacitor, inductor and freewheel diode of a conventional secondary side buck or boost circuit are removed, hence yielding a significant cost savings.

Particularly, FIG. 1 illustrates a high level schematic diagram of an LED driving arrangement 10 comprising: an inductance element 20, illustrated and described herein as a transformer 20 and comprising a primary winding 30 and a secondary winding 40 magnetically coupled to primary winding 30; a switching circuit 50, switching circuit 50 comprising a primary side electronically controlled switch Q1, illustrated and described herein as an n-channel metal-oxide-semiconductor field-effect-transistor (NFET) Q1; a unidirectional electronic valve D1, illustrated and described herein as a diode D1; a capacitive element C1, illustrated and described herein as a capacitor C1; a secondary side electronically controlled switch Q2, illustrated and described herein as an NFET Q2; an LED based luminaire 60, illustrated and described herein as an LED string 60; and a control circuitry 70.

A first end of primary winding 30 is coupled to a power lead and a second end of primary winding 30, whose polarity is denoted with a dot, is coupled to the drain of NFET Q1. The source of NFET Q1 is coupled to a return lead and the gate of NFET Q1 is coupled to a respective output of control circuitry 70 (connection not showed). A first end of secondary winding 40, whose polarity is denoted with a dot, is coupled to the anode of diode D1 and the cathode of diode D1 is coupled to a first end of capacitor C1 and the anode end of LED string 60. A second end of capacitor C1 and the cathode end of LED string 60 are commonly coupled to the drain of NFET Q2. The gate of NFET Q2 is coupled to a respective output of control circuitry 70 (connection not shown). The source of NFET Q2 and the second end of secondary winding 40 are each coupled to a common potential. The common potential is further coupled to the metal chassis of a device. Further illustrated is the parasitic capacitance generated between LED string 60 and the metal chassis, the parasitic capacitance denoted CS.

In operation, control circuitry 70 is arranged to alternately switch NFET Q1 between an open state and a closed state. When NFET Q1 is in a closed state, transformer 20 is charged. When NFET Q2 is opened, the charge of transformer 20 is output at secondary winding 40 due to the opposing polarities of primary winding 30 and secondary winding 40. Control circuitry 70 is further arranged to alternately switch NFET Q2 between an open state and a closed state in order to maintain a desired voltage across LED string 60. When NFET Q2 is in a closed state, the power output at secondary winding is provided to LED string 60 and capacitor C1. As a result, current flows through LED string 60 and light is emitted. When NFET Q2 is in an open state there is no current path through LED string 60.

This works well under many application circumstances. However, a particular issue occurs when LED string 60 bears a large parasitic capacitance CS and such parasitic capacitance is loaded to the regulating NFET Q2. As described above, parasitic capacitance CS exists between LED string 60 and the metal chassis when LED string 60 is installed tightly onto the metal chassis, in most occasions to utilize the metal chassis as a heat sink. When the ground of the LED drive circuit is connected to the metal chassis, as described above, the parasitic capacitance is loaded to the switching loop of NFET Q2. Particularly, when NFET Q2 is opened parasitic capacitance CS is charged by the power output at secondary winding 40, and no discharge path is provided. When NFET Q2 is then closed, a current spike will occur due to the discharge of CS through LED string 60 and NFET Q2. This result is different from the charging of the LED string 60 current at turn on of NFET Q2, since at turn on edge the current rising rate dI/dt is limited by the inductance of secondary winding 40 of transformer 20, whereas the discharge spike of parasitic capacitance CS shows a sharp wave shape due to the lack of dI/dt limiting element in the discharging path. This current spike may be sufficient to damage one or more of NFET Q2 and LED string 60.

Similarly, FIG. 2 illustrates a high level schematic diagram of an LED driving arrangement 100 comprising: an inductance element 120, illustrated and described herein as a transformer 120 and comprising a primary winding 130 and a secondary winding 140 magnetically coupled to primary winding 130; a switching circuit 150, switching circuit 150 comprising a first primary side electronically controlled switch Q3, illustrated and described herein as an NFET Q3 and a second primary side electronically controlled switch Q4, illustrated and described herein as an NFET Q4; a capacitance element CX, illustrated and described herein as a capacitor CX; a unidirectional electronic valve D2, illustrated and described herein as a diode D2; a unidirectional electronic valve D3, illustrated and described herein as a diode D3; a capacitor C1; an NFET Q2; an LED string 60; and a control circuitry 160.

The drain of NFET Q3 is coupled to a power lead and the gate of NFET Q3 is coupled to a respective output of control circuitry 160 (the connection not shown). The source of NFET Q3 is coupled to the drain of NFET Q4 and a first end of capacitor CX. A second end of capacitor CX is coupled to a first end of primary winding 130. A second end of primary winding 130 is coupled to the source of NFET Q4 and a return lead. The gate of NFET Q3 and the gate of NFET Q4 are each coupled to a respective output of control circuitry 160 (the connection not shown).

A first end of secondary winding 140 is coupled to the anode of diode D2 and a second end of secondary winding 140 is coupled to the anode of diode D3. The cathodes of diode D2 and diode D3 are commonly coupled to the first end of capacitor C1 and the anode end of LED string 60. The second end of capacitor C1 and the cathode end of LED string 60 are commonly coupled to the drain of NFET Q2. The gate of NFET Q2 is coupled to a respective output of control circuitry 160. The source of NFET Q2 and a center tap of secondary winding 140 are each coupled to a common potential. The common potential is further coupled to the metal chassis, as described above in relation to LED driving arrangement 10. Parasitic capacitance CS is further illustrated, between the anode end of LED string 60 and the metal chassis, as described above.

In operation, control circuitry 160 is arranged to alternately switch each of NFETs Q3 and Q4 between an open state and a closed state, with a dead time insertion, while ensuring that NFETs Q3 and Q4 are not both in a closed state contemporaneously. When NFET Q3 is in a closed state, and NFET Q4 is in an open state, primary winding 130 is charged in a first direction and a power is output from a first half of secondary winding 140 via diode D2. When NFET Q4 is in a closed state, and NFET Q3 is in an open state, primary winding 130 is charged in the opposite direction and a power is output from a second half of secondary winding 140 via diode D3. Capacitor CX is arranged to balance the charge of primary winding 130 during the cycle.

Control circuitry 160 is further arranged to alternately switch NFET Q2 between an open state and a closed state in order to maintain a desired voltage across LED string 60. As described above, when NFET Q2 is in a closed state, the power output at secondary winding is provided to LED string 60 and capacitor C1, and parasitic capacitance CS is charged. As a result, current flows through LED string 60 and light is emitted. When NFET Q2 is in an open state, parasitic capacitance CS is left charged, with no discharge path, as described above. Thus, when NFET Q2 switches to a closed state, a current spike is created by the discharge of parasitic capacitance CS through the series path of LED string 60 and NFET Q2. This current spike may be sufficient to damage one or more of NFET Q2 and LED string 60.

What is desired, and not provided by the prior art, is an arrangement to reduce the effect of the parasitic capacitance in the switching operation that causes sharp discharging current spikes.

SUMMARY OF THE INVENTION

Accordingly, it is a principal object of the present invention to overcome at least some of the disadvantages of the prior art. This is provided in one embodiment by an LED driving arrangement comprising: a control circuitry; an inductance element having a primary side and a secondary side; a switching circuit, the inductance element arranged, responsive to the switching circuit, to receive power at the primary side from a power source, and the inductance element further arranged, responsive to the received power at the primary side, to output at the secondary side a function of the received power; at least one LED based luminaire; a parasitic capacitance between the at least one LED based luminaire and a chassis; and an electronically controlled switch coupled between the secondary side of the inductance element and the at least one LED based luminaire, wherein the electronically controlled switch is arranged, responsive to the control circuitry, to alternately switch between an open state and a closed state, the at least one LED based luminaire arranged to receive the output power when the electronically controlled switch is in the closed state and not receive the output power when the electronically controlled switch is in the open state, and wherein the electronically controlled switch, the secondary side of the inductance element and a discharge path of said parasitic capacitance are coupled in series.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION OF PREFERRED EMBODIMENTS

Figure 1:
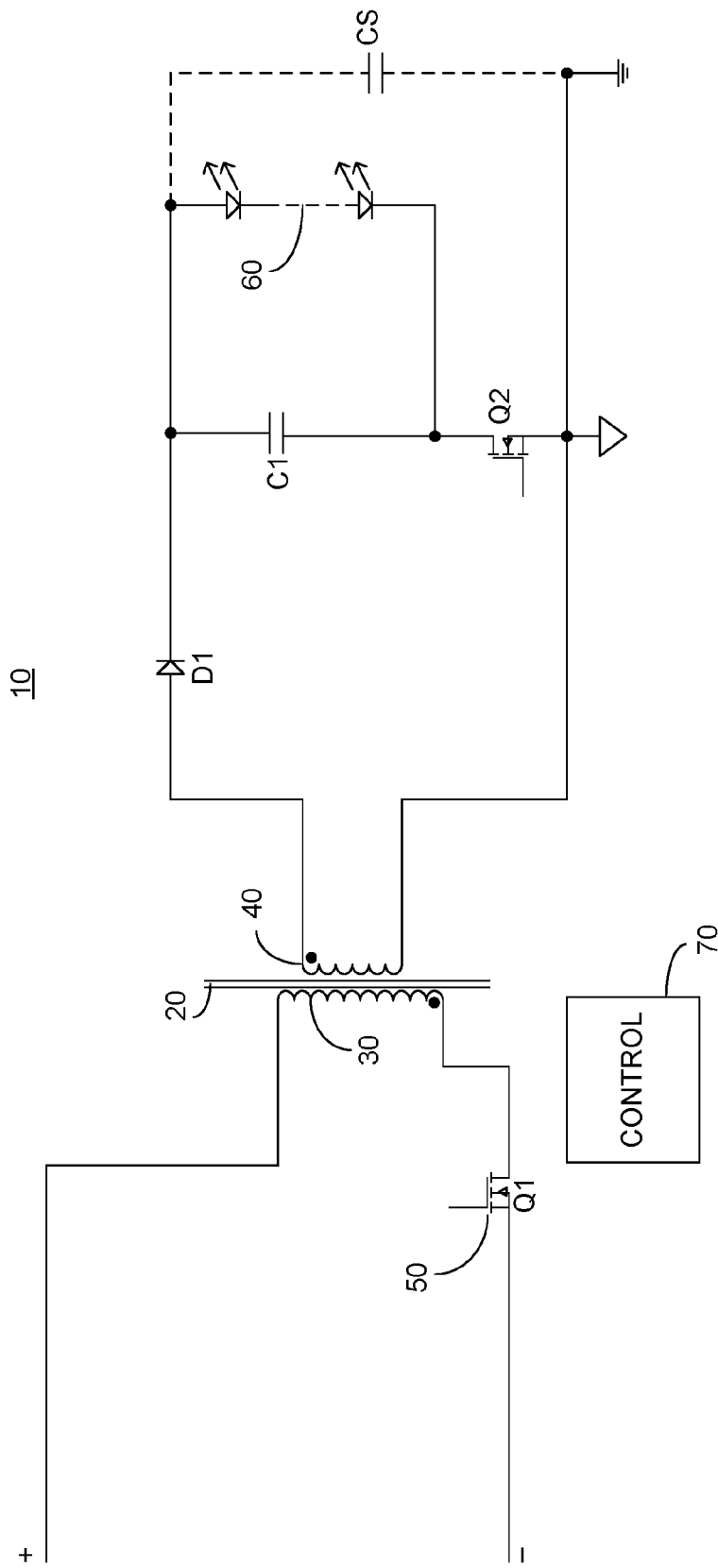
FIG. 1 illustrates a high level schematic diagram of a prior art LED driving arrangement with a fly back arrangement on the primary side.
Figure 2:
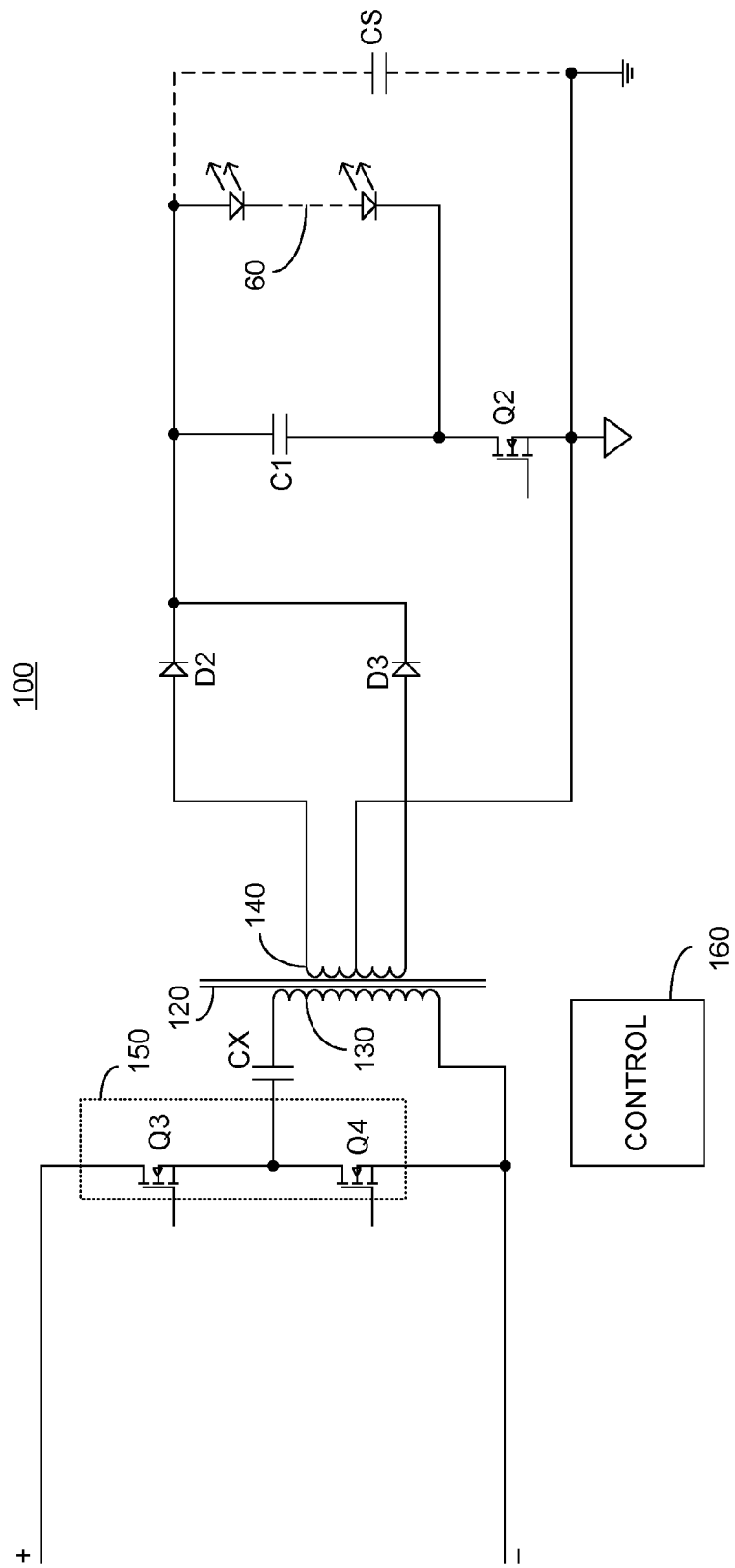
FIG. 2 illustrates a high level schematic diagram of a prior art LED driving arrangement with an LLC half bridge arrangement on the primary side.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term "coupled" as used herein is not meant to be limited to a direct connection, and allows for intermediary devices or components without limitation.

Figure 3A:
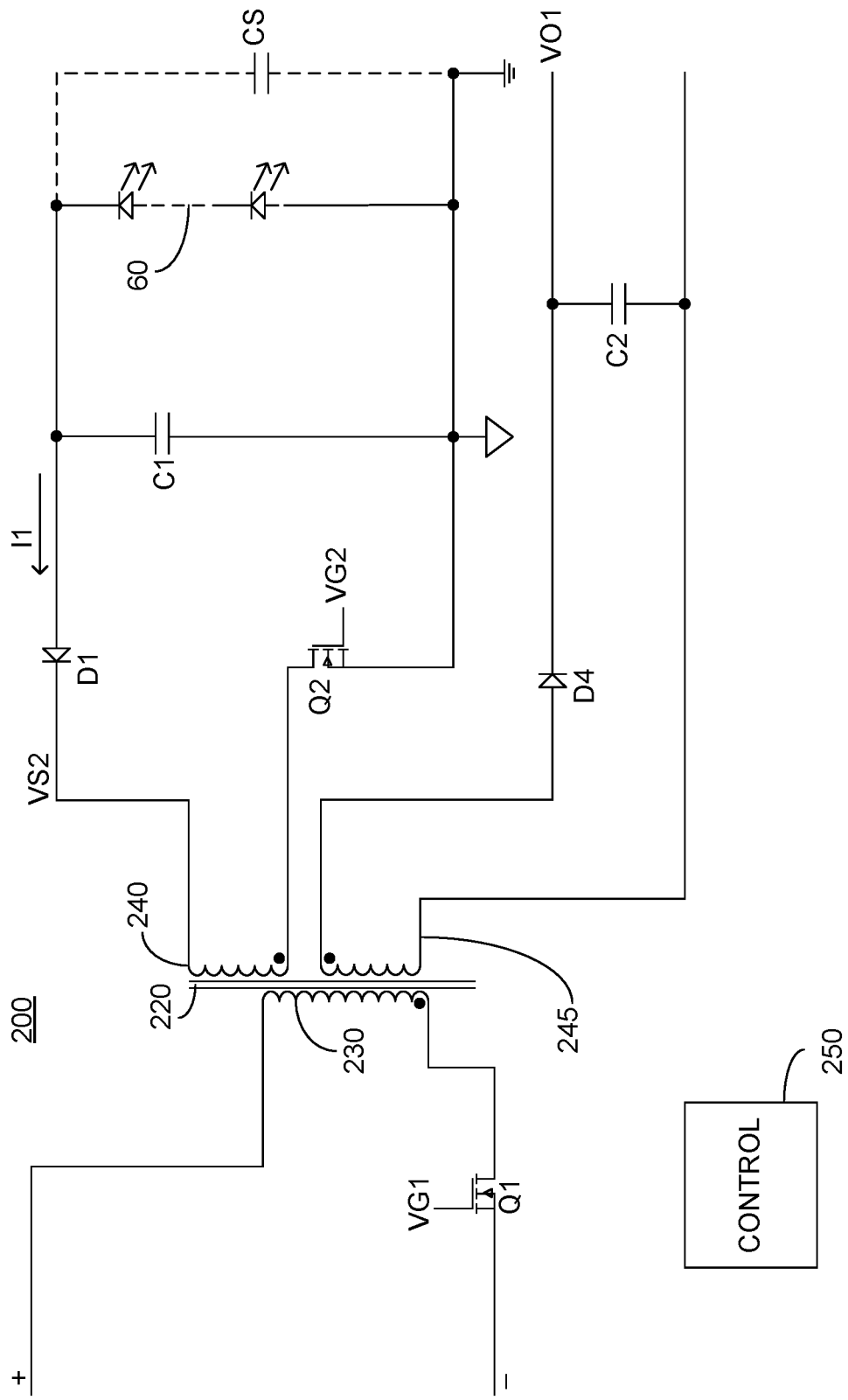
FIG. 3A illustrates a high level schematic diagram of a first embodiment of an LED driving arrangement for a single LED string with a fly back arrangement on the primary side and a synchronously driven NFET inserted between chassis ground and one winding end of the driving transformer secondary, according to certain embodiments.

FIG. 3A illustrates a high level schematic diagram of an LED driving arrangement 200, according to certain embodiments. LED driving arrangement 200 comprises: an inductance element 220, illustrated and described herein as a transformer 220 and comprising a primary winding 230, a first secondary winding 240 and a second secondary winding 245, each magnetically coupled to primary winding 230; an NFET Q1; a diode D1; a capacitor C1; an NFET Q2; an LED string 60; a unidirectional electronic valve D4, illustrated and described herein as a diode D4; a capacitance element C2, illustrated and described herein as a capacitor C2; and a control circuitry 250.

A first end of primary winding 230 is coupled to a power lead and a second end of primary winding 230, whose polarity is denoted with a dot, is coupled to the drain of NFET Q1. The source of NFET Q1 is coupled to a return lead and the gate of NFET Q1 is coupled to a respective output of control circuitry 250 (connection not showed), the signal at the gate of NFET Q1 denoted VG1. A first end of first secondary winding 240, whose voltage potential in relation to a common potential is denoted VS2, is coupled to the cathode of diode D1 and the anode of diode D1 is coupled to a first end of capacitor C1 and the cathode end of LED string 60. The parasitic capacitance CS of LED string 60 is further illustrated between the cathode end of LED string 60 and the metal chassis, as described above. A second end of capacitor C1 and the anode end of LED string 60 are each coupled to the common potential, the common potential further coupled to a metal chassis. The second end of first secondary winding 240, whose polarity is denoted with a dot, is coupled to the drain of NFET Q2 and the gate of NFET Q2 is coupled to a respective output of control circuitry 250 (connection not shown), the signal at the gate of NFET Q2 denoted VG2. The source of NFET Q2 is coupled to the common potential. The current of first secondary winding 40 is denoted I1.

A first end of second secondary winding 245, whose polarity is denoted with a dot, is coupled to the anode of diode D4 and the cathode of diode D4 is coupled to a first end of capacitor C2, and to an output node denoted VO1. The second end of second secondary winding 245 and the second end of capacitor C2 are coupled to the common potential.

Figure 3B:
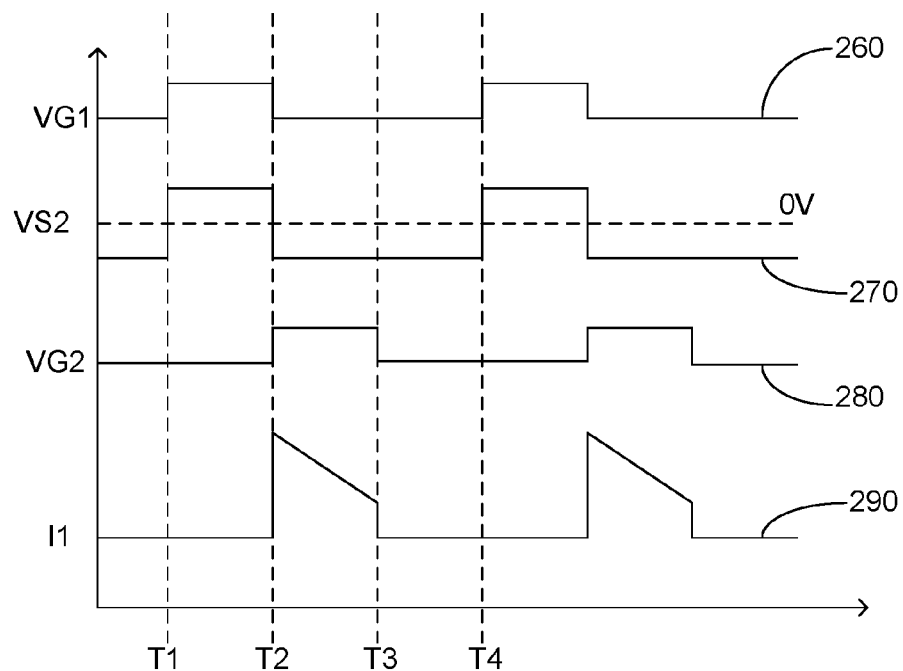
FIG. 3B illustrates various waveforms of a first embodiment of the operation of the LED driving arrangement of FIG. 3A.

A first embodiment of the operation of LED driving arrangement 200 will be described herein in relation to the waveform graphs of FIG. 3B where the x-axis represents time and the y-axis represents amplitude in arbitrary units. Particularly, signal VG1 is illustrated by trace 260, voltage VS2 is illustrated by trace 270, signal VG2 is illustrated by trace 280 and the amplitude of current I1 is illustrated by trace 290.

At time T1, control circuitry 250 is arranged to output a high signal VG1 to the gate of NFET Q1, thereby switching NFET Q1 to a closed state. Primary winding 230 is thereby charged and voltage VS2 rises, diodes D1 and D4 preventing power from being output at the respective secondary windings 240 and 245. Signal VG2 is low, thus NFET Q2 is in an open state. Since diode D1 is reverse biased to block current flow I1 during the whole conduction period of NFET Q1, the turn on edge of NFET Q2 can be deployed at any time point between T1 and T2 without affecting the regulation operation of NFET Q2.

At time T2, control circuitry 250 is arranged to output a low signal VG1 and a high signal VG2, thereby opening NFET Q1 and closing NFET Q2. Voltage VS2 thus becomes negative in relation to the common potential and diodes D1 and D4 are forward biased and are able to conduct. Additionally, closed NFET Q2 provides a path for current I1 which rises and causes LED string 60 to output light.

When regulating NFET Q2 is turned on, the currents flowing through LED string 60, smoothing capacitor C1, and the parasitic capacitance CS are merged at the source of NFET Q2. These currents, including the current through the parasitic capacitance CS, which form current I1, all flow through NFET Q2 and first secondary winding 240. Because of the existence of secondary winding 240 of transformer 220 in the current flowing loop, the dI/dt of these currents are all limited by the inductance of first secondary winding 240. Thus, with the dI/dt limiting function caused by the inductance of first secondary winding 240, the sharp discharging current spike of parasitic capacitance CS is effectively eliminated, and instead a smooth decline towards the normal operating current of I1 is shown. In further explanation, NFET Q2, secondary winding 240 and a discharge path of parasitic capacitance CS are advantageously coupled in series, thus preventing any current spike. In one embodiment, the position of diode D1 can also be changed, with its cathode connected to the drain of NFET Q2 and the anode connected to the dotted terminal of first secondary winding 240.

At time T3, control circuitry 250 is arranged to output a low signal VG2 thereby switching NFET Q2 into an open state and ceasing current flow I1 through LED string 60 in accordance with the desired luminance output of LED string 60. At time T4, NFET Q1 is closed, as described above in relation to time T1.

At time T2, power is also output by second secondary winding 245 to output VO1. In one embodiment (now shown), a feedback loop is provided to control the duty cycle of NFET Q1 so as to maintain the voltage of output VO1 at a predetermined value.

Figure 3C:
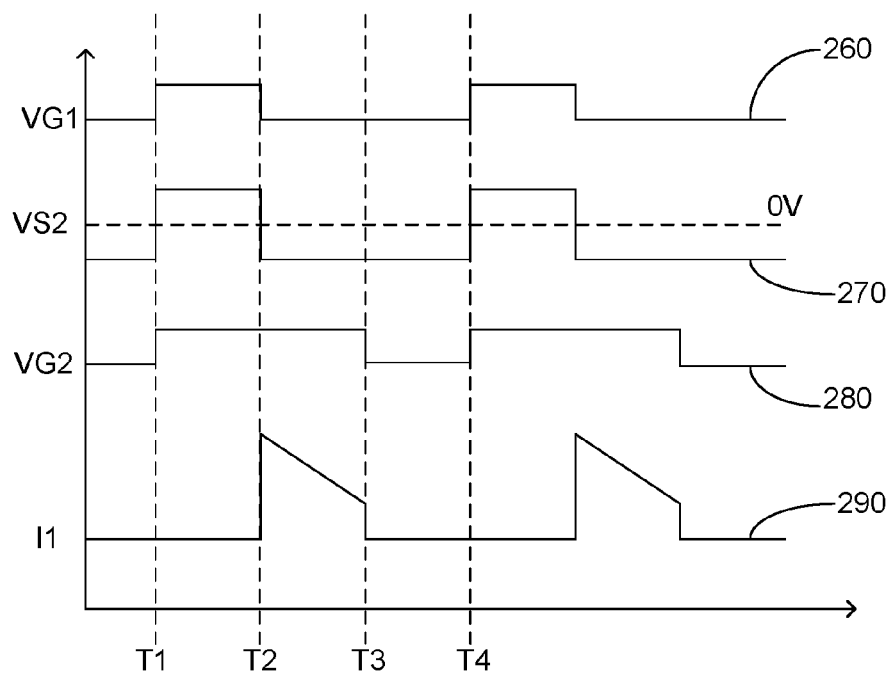
FIG. 3C illustrates various waveforms of a second embodiment of the operation of the LED driving arrangement of FIG. 3A.

A second embodiment of the operation of LED driving arrangement 200 will be described herein in relation to the waveform graphs of FIG. 3C where the x-axis represents time and the y-axis represents amplitude in arbitrary units. Particularly, signal VG1 is illustrated by trace 260, voltage VS2 is illustrated by trace 270, signal VG2 is illustrated by trace 280 and the amplitude of current I1 is illustrated by trace 290. At time T1, control circuitry 250 is arranged to output a high signal VG1 to the gate of NFET Q1, thereby switching NFET Q1 to a closed state. Primary winding 230 is thereby charged and voltage VS2 rises, diodes D1 and D4 preventing power from being output at the respective secondary windings 240 and 245. Control circuitry 250 is further arranged to output a high signal VG2, thus NFET Q2 is in a closed state, however due to the polarity of diode D1 current I1 remains zero.

At time T2, control circuitry 250 is arranged to output a low signal VG1, thereby opening NFET Q1. Voltage VS2 thus becomes negative and diodes D1 and D4 are forward biased and begin to conduct, as described above.

As described above, the currents flowing through LED string 60, smoothing capacitor C1, and the parasitic capacitance CS are merged at the source of NFET Q2. These currents, including the current through the parasitic capacitance CS, which form current I1, all flow through NFET Q2 and first secondary winding 240. Because of the existence of secondary winding 240 of transformer 220 in the current flowing loop, the dI/dt of these currents are all limited by the inductance of first secondary winding 240. Thus, with the dI/dt limiting function by the inductance of first secondary winding 240, the sharp discharging current spike of parasitic capacitance CS is effectively eliminated, resulting instead in a smooth decline towards the normal operating current of I1, as shown.

At time T3, control circuitry 250 is arranged to output a low signal VG2 thereby switching NFET Q2 into an open state and ceasing current flow through LED string 60 in accordance with the desired luminance output of LED string 60. At time T4, NFET Q1 is closed and NFET Q2 is opened, as described above in relation to time T1.

Figure 3D:
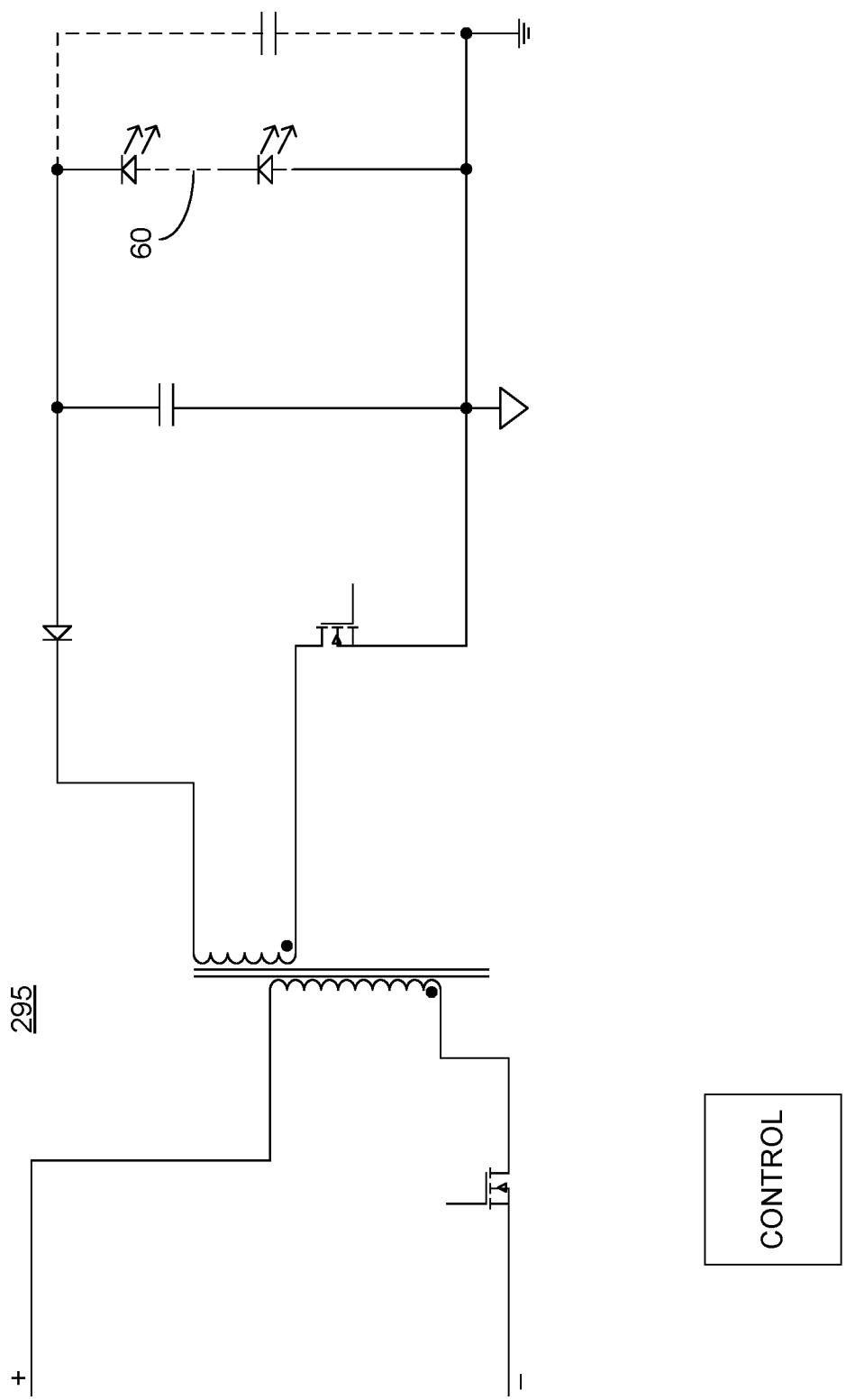
FIG. 3D illustrates a high level schematic diagram of a second embodiment of an LED driving arrangement for a single LED string with a fly back arrangement on the primary side and a synchronously driven NFET inserted between chassis ground and one winding end of the driving transformer secondary, according to certain embodiments.

FIG. 3D illustrates a high level schematic diagram of an LED driving arrangement 295, according to certain embodiments. The construction and operation of LED driving arrangement 295 is in all respects similar to the construction and operation of LED driving arrangement 200, with the exception that second secondary winding 245 is not provided, and in the interest of brevity will not be further described. Control of the primary winding switching timing is then accomplished responsive to a voltage detected across a secondary winding, or across the LED string 60.

Figure 4A:
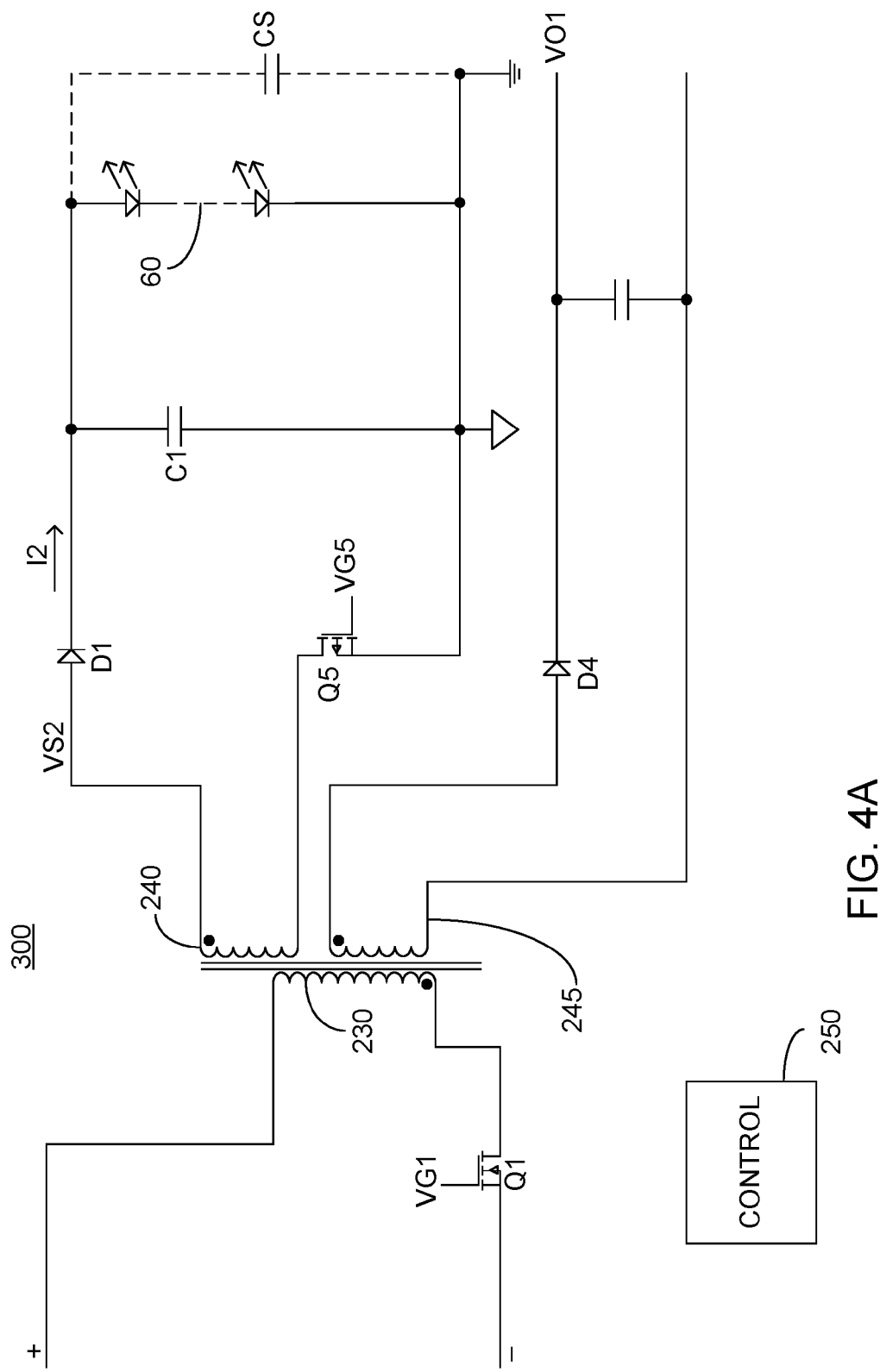
FIG. 4A illustrates a high level schematic diagram of an LED driving arrangement for a single LED string with a fly back arrangement on the primary side and a synchronously driven PFET inserted between one winding end of the driving transformer secondary and the anode end of the LED string, according to certain embodiments.

FIG. 4A illustrates a high level schematic diagram of an LED driving arrangement 300. LED driving arrangement 300 is in all respects similar to LED driving arrangement 200, with the exception that NFET Q2 is replaced with a p-channel metal-oxide-semiconductor field-effect-transistor (PFET) Q5. Additionally, diode D1, LED string 60 and the polarity of first secondary winding 240 are reversed. Particularly, the first end of first secondary winding 240, whose polarity is denoted with a dot, is coupled to the anode of diode D1 and the cathode of diode D1 is coupled to the first end of capacitor C1 and the anode end of LED string 60. The second end of first secondary winding 240 is coupled to the drain of PFET Q5 and the gate of PFET Q5 is coupled to a respective output of control circuitry 250 (connection not shown), the signal on the gate of PFET Q5 denoted VG5. The source of PFET Q5, the second end of capacitor C1 and the cathode end of LED string 60 are each coupled to the common potential, as described above. The parasitic capacitance CS of LED string 60 is further illustrated between the anode end of LED string 60 and the metal chassis, as described above. As will be described below, the current flows in the opposite direction of current I1, and is thus denoted 12.

Figure 4B:
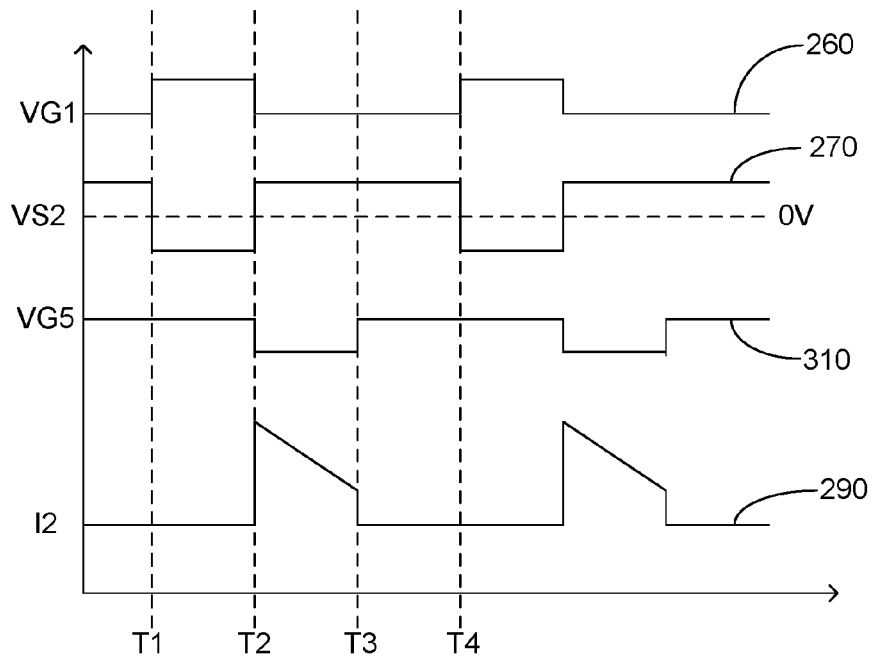
FIG. 4B illustrates various waveforms of a first embodiment of the operation of the LED driving arrangement of FIG. 4A.

A first embodiment of the operation of LED driving arrangement 300 will be described herein in relation to the waveform graphs of FIG. 4B where the x-axis represents time and the y-axis represents amplitude in arbitrary units. Particularly, signal VG1 is illustrated by trace 260, voltage VS2 is illustrated by trace 270, signal VG5 is illustrated by trace 310 and the amplitude of current I1 is illustrated by trace 290. At time T1, control circuitry 250 is arranged to output a high signal VG1 to the gate of NFET Q1, thereby switching NFET Q1 to a closed state. Primary winding 230 is thereby charged and voltage VS2 becomes negative, diodes D1 and D4 preventing power from being output at the respective secondary windings 240 and 245. Signal VG5 is high, thus PFET Q5 is in an open state. Since diode D1 is reverse biased to block current flow 12 during the whole conduction period of NFET Q1, the turn on edge of PFET Q5 can be deployed at any time point between T1 and T2 without affecting the regulation operation of PFET Q5.

At time T2, control circuitry 250 is arranged to output a low signal VG1 and a low signal VG5, thereby opening NFET Q1 and closing PFET Q5. Voltage VS2 thus becomes positive and diodes D1 and D4 are forward biased and are able to conduct. Additionally, closed PFET Q5 provides a path for current 12 which rises and causes LED string 60 to output light.

When PFET Q5 is turned on, the currents flowing through LED string 60, smoothing capacitor C1, and the parasitic capacitance CS are merged to form current I2, which flows through PFET Q5 and first secondary winding 240. Because of the existence of secondary winding 240 of transformer 220 in the current flowing loop, the dI/dt of these currents are all limited by the inductance of first secondary winding 240, as described above. Thus, with the dI/dt limiting function by the inductance of first secondary winding 240, the sharp discharging current spike of parasitic capacitance CS is effectively eliminated resulting instead in a smooth decline towards the normal operating current of I1 is shown. In one embodiment, the position of diode D1 can also be changed, with its anode connected to the drain of PFET Q5 and the cathode connected to the second end of first secondary winding 240.

At time T3, control circuitry 250 is arranged to output a high signal VG5 thereby switching PFET Q5 into an open state and ceasing current flow through LED string 60 in accordance with the desired luminance output of LED string 60. At time T4, NFET Q1 is closed, as described above in relation to time T1.

At time T2, power is also output by second secondary winding 245 to output VO1. In one embodiment (now shown), a feedback loop is provided to control the duty cycle of NFET Q1 so as to maintain the voltage of output VO1 at a predetermined value.

Figure 4C:
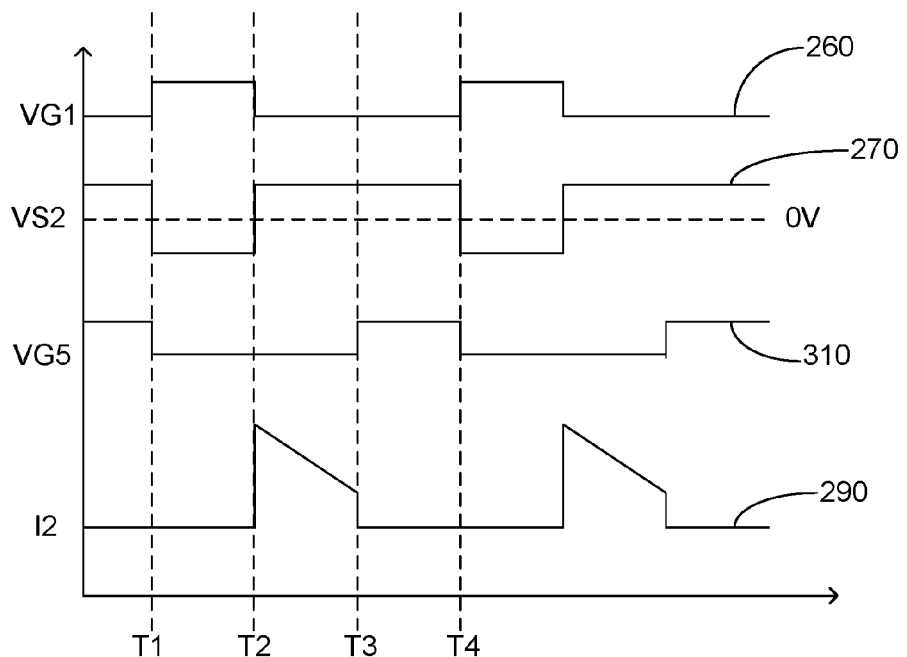
FIG. 4C illustrates various waveforms of a second embodiment of the operation of the LED driving arrangement of FIG. 4A.

A second embodiment of the operation of LED driving arrangement 200 is illustrated in the waveform graphs of FIG. 4C where the x-axis represents time and the y-axis represents amplitude in arbitrary units. Particularly, signal VG1 is illustrated by trace 260, voltage VS2 is illustrated by trace 270, signal VG5 is illustrated by trace 310 and the amplitude of current I1 is illustrated by trace 290. The waveforms of FIG. 4C is similar to the waveforms of FIG. 4B with the exception that VG5 is switched to low at time T1. As described above in relation to FIG. 3C, similar to NFET Q2, PFET Q5 can be switched at any point during the cycle of NFET Q1 without affecting current I2.

Figure 5A:
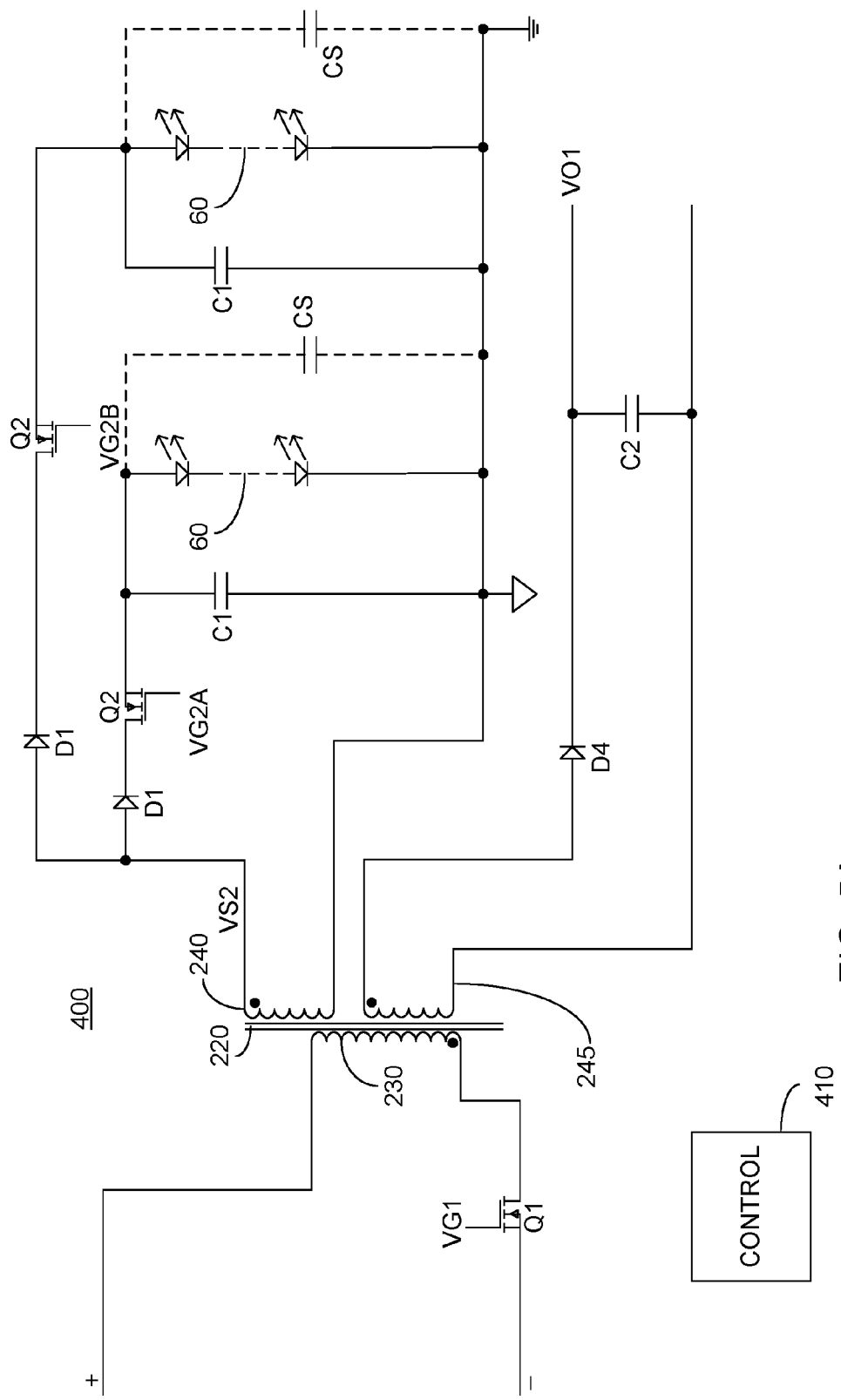
FIG. 5A illustrates a high level schematic diagram of an LED driving arrangement for multiple LED strings with a fly back arrangement on the primary side, where a respective synchronously driven NFET is inserted between one winding end of the driving transformer secondary and the anode end of the respective LED string, according to certain embodiments.

FIG. 5A illustrates a high level schematic diagram of a LED driving arrangement 400. LED driving arrangement 400 comprises: a transformer 220, comprising a primary winding 230, a first secondary winding 240 and a second secondary winding 245, each magnetically coupled to primary winding 240; an NFET Q1; a pair of diodes D1; a diode D4; a pair of NFETs Q2; a pair of capacitors C1; a capacitor C2; a pair of LED strings 60; and a control circuitry 410.

A first end of primary winding 230 is coupled to a power lead and a second end of primary winding 230, whose polarity is denoted with a dot, is coupled to the drain of NFET Q1. The source of NFET Q1 is coupled to a return lead and the gate of NFET Q1 is coupled to a respective output of control circuitry 250 (connection not showed), the signal at the gate of NFET Q1 denoted VG1.

A first end of first secondary winding 240, whose polarity is denoted by a dot, is coupled to the anode of each diode D1 and the cathode of each diode D1 is coupled to the drain of a respective NFET Q2. The gate of a first NFET Q2 is coupled to a respective output of control circuitry 410 (connection not shown), the signal at the gate of first NFET Q2 denoted VG2A, and the gate of a second NFET Q2 is coupled to a respective output of control circuitry 410 (connection not shown), the signal at the gate of second NFET Q2 denoted VG2B. The source of each NFET Q2 is coupled to a first end of a respective capacitor C1 and the anode end of a respective LED string 60. A second end of each capacitor C1 and the cathode end of each LED string 60 are each coupled to a common potential, which is further connected to a metal chassis. The second end of first primary winding 240 is coupled to the common potential. The parasitic capacitance CS of each LED string 60 is further illustrated between the anode end of the respective LED string 60 and the metal chassis, as described above.

A first end of second secondary winding 245, whose polarity is denoted with a dot, is coupled to the anode of diode D4 and the cathode of diode D4 is coupled to a first end of capacitor C2, and to an output node denoted VO1. The second end of second secondary winding 45 and the second end of capacitor C2 are coupled to the common potential.

Figure 5B:
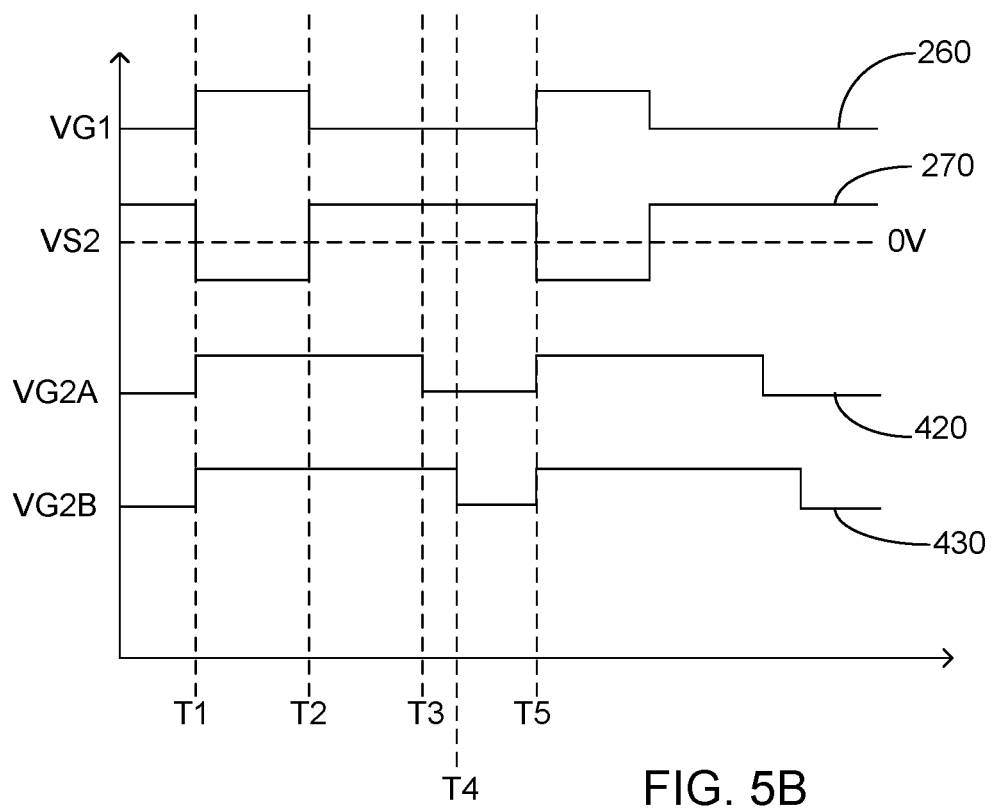
FIG. 5B illustrates various waveforms of the operation of the LED driving arrangement of FIG. 5A.

The operation of LED driving arrangement 400 will be described herein in relation to the waveform graphs of FIG. 5B where the x-axis represents time and the y-axis represents amplitude in arbitrary units. Particularly, signal VG1 is illustrated by trace 260, voltage VS2 is illustrated by trace 270, signal VG2A is illustrated by trace 420 and signal VG2B is illustrated by trace 430. At time T1, control circuitry 410 is arranged to output a high signal VG1 to the gate of NFET Q1, thereby switching NFET Q1 to a closed state. Primary winding 230 is thereby charged and voltage VS2 becomes negative, diodes D1 and D4 preventing power from being output at the respective secondary windings 240 and 245. Control circuitry 410 is further arranged to output high signals VG2A and VG2B, thereby closing both NFETs Q2, however as indicated above due to the polarity of diodes D1 no current flows through LED strings 60.

At time T2, control circuitry 250 is arranged to output a low signal VG1 thereby opening NFET Q1. Voltage VS2 thus becomes positive and diodes D1 and D4 are forward biased and are able to conduct. As described above, the current through each parasitic capacitance flows through first secondary winding 240, the dI/dt limiting function of first secondary winding 240 effectively eliminating the sharp discharging current spike of parasitic capacitances CS.

At time T3, control circuitry 410 is arranged to output a low signal VG2A thereby switching the respective NFET Q2 into an open state and ceasing current flow through the respective LED string 60 in accordance with the desired luminance output of LED string 60. At time T4, control circuitry 410 is arranged to output a low signal VG2B thereby switching the respective NFET Q2 into an open state and ceasing current flow through the respective LED string 60 in accordance with the desired luminance output of LED string 60. At time T5, NFET Q1 is closed, as described above in relation to time T1.

At time T2, power is also output by second secondary winding 245 to output VO1. In one embodiment (now shown), a feedback loop is provided to control the duty cycle of NFET Q1 so as to maintain the voltage of output VO1 at a predetermined value.

Figure 6A:
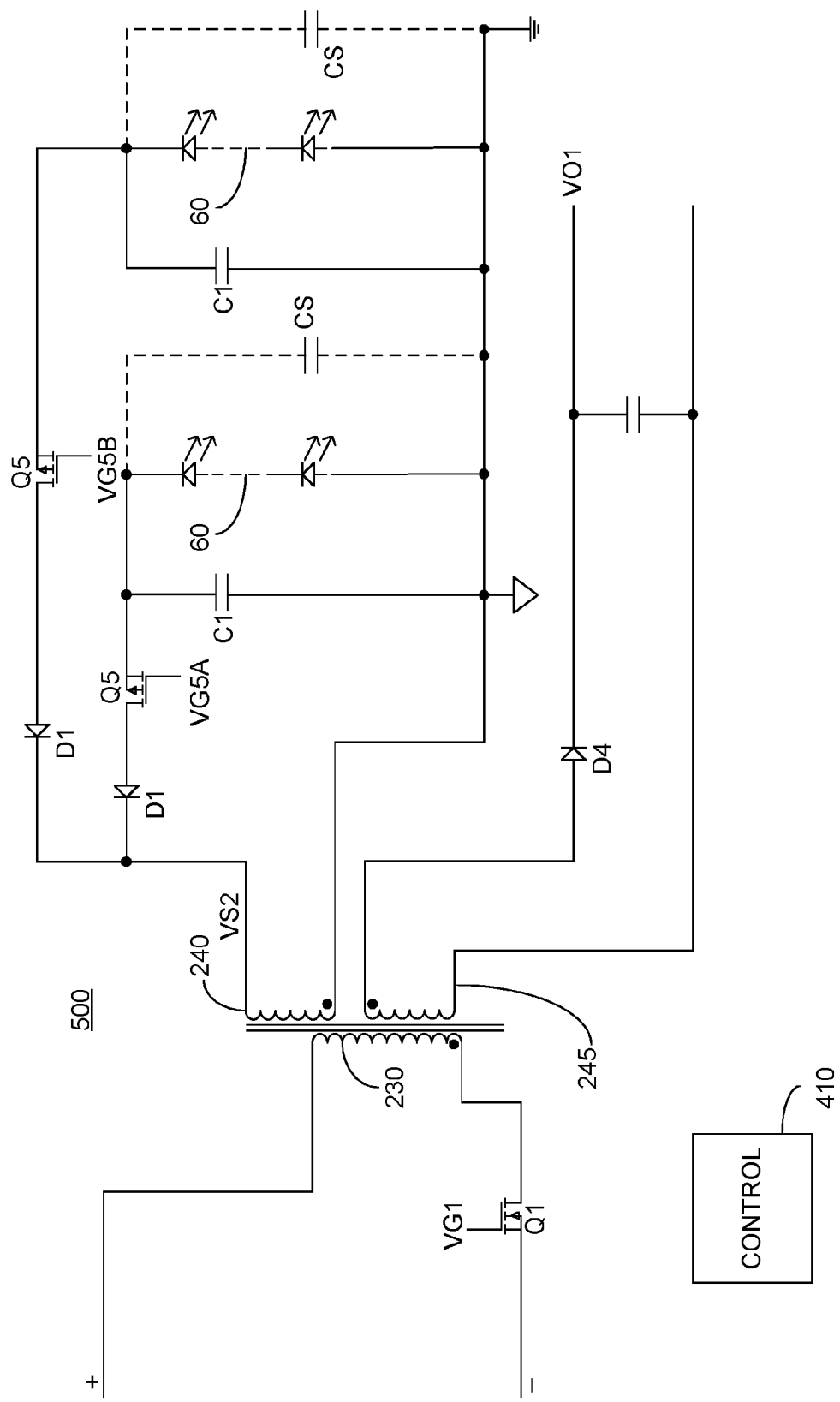
FIG. 6A illustrates a high level schematic diagram of an LED driving arrangement for multiple LED strings with a fly back arrangement on the primary side, where a respective synchronously driven PFET is inserted between one winding end of the driving transformer secondary and the anode end of the respective LED string, according to certain embodiments.

FIG. 6A illustrates a high level schematic diagram of an LED driving arrangement 500, according to certain embodiments. LED driving arrangement 500 is in all respects similar to LED driving arrangement 400, with the exception that each NFET Q2 is replaced with a PFET Q5. Additionally, diodes D1, LED strings 60 and the polarity of first secondary winding 240 are reversed. Particularly, the first end of first secondary winding 240 is coupled to the cathode of each diode D1 and the anode of each diode D1 is coupled to the drain of a respective PFET Q5. The source of each PFET Q5 is coupled to the first end of a respective capacitor C1 and the cathode end of a respective LED string 60. The gate of each PFET Q5 is coupled to a respective output of control circuitry 410 (the connection not shown), the signal on the gate of PFET Q5 denoted VG5A and VG5B, respectively. The second end of first secondary winding 240, whose polarity is denoted with a dot, is coupled to the common potential. Similarly, the anode end of each LED string 60 and the second end of each capacitor C1 are each coupled to the common potential. The parasitic capacitance CS of each LED string 60 is further illustrated between the cathode end of the respective LED string 60 and the metal chassis, as described above.

Figure 6B:
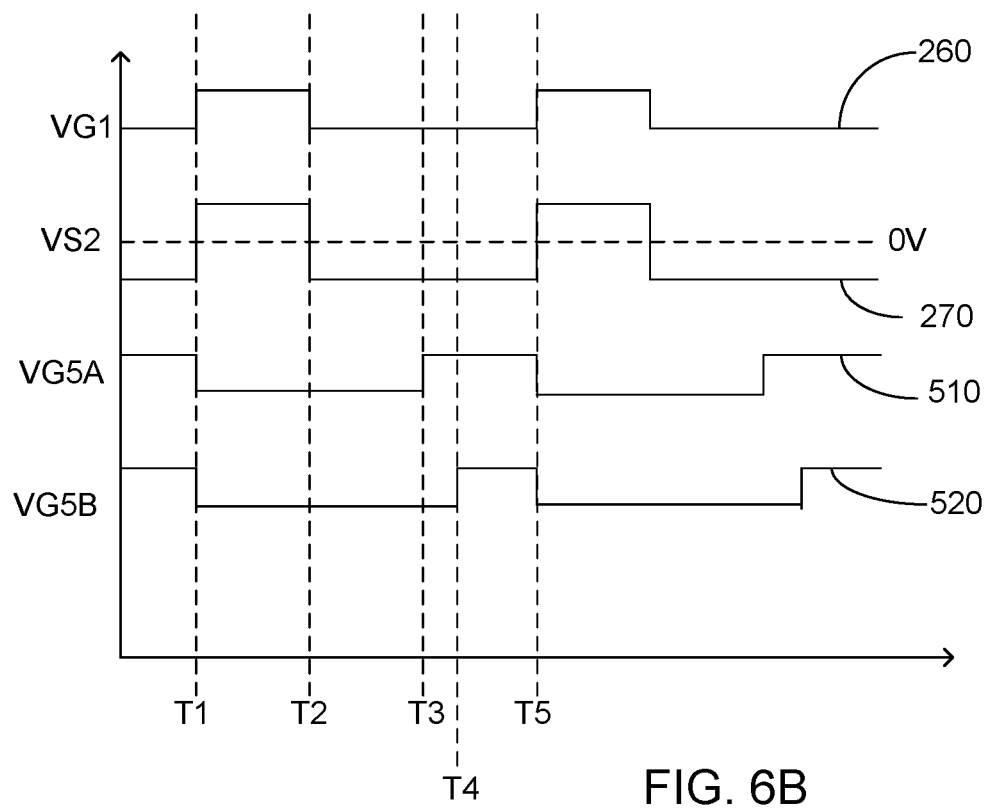
FIG. 6B illustrates various waveforms of the operation of the LED driving arrangement of FIG. 6A.

The operation of LED driving arrangement 500 will be described herein in relation to the waveform graphs of FIG. 6B where the x-axis represents time and the y-axis represents amplitude in arbitrary units. Particularly, signal VG1 is illustrated by trace 260, voltage VS2 is illustrated by trace 270, signal VG5A is illustrated by trace 510 and signal VG5B is illustrated by trace 520. At time T1, control circuitry 410 is arranged to output a high signal VG1 to the gate of NFET Q1, thereby switching NFET Q1 to a closed state. Primary winding 230 is thereby charged and voltage VS2 rises, diodes D1 and D4 preventing current flow from the respective secondary windings 240 and 245. Control circuitry 410 is further arranged to output low signals VG5A and VG5B, thereby closing both PFETs Q5, however due to the polarity of diodes D1 no current flow occurs through LED strings 60.

At time T2, control circuitry 250 is arranged to output a low signal VG1 thereby opening NFET Q1. Voltage VS2 thus becomes negative and diodes D1 and D4 are forward biased and are able to conduct. As described above, the current through each parasitic capacitance CS flows through first secondary winding 240, the dI/dt limiting function of first secondary winding 240 effectively eliminating the sharp discharging current spike of parasitic capacitances CS.

At time T3, control circuitry 410 is arranged to output a high signal VG5A thereby switching the respective PFET Q5 into an open state and ceasing current flow through the respective LED string 60 in accordance with the desired luminance output of LED string 60. At time T4, control circuitry 410 is arranged to output a high signal VG5B thereby switching the respective NFET Q2 into an open state and ceasing current flow through the respective LED string 60 in accordance with the desired luminance output of LED string 60. At time T5, NFET Q1 is closed, as described above in relation to time T1.

At time T2, power is also output by second secondary winding 245 to output VO1. In one embodiment (now shown), a feedback loop is provided to control the duty cycle of NFET Q1 so as to maintain the voltage of output VO1 at a predetermined value.

Figure 7A:
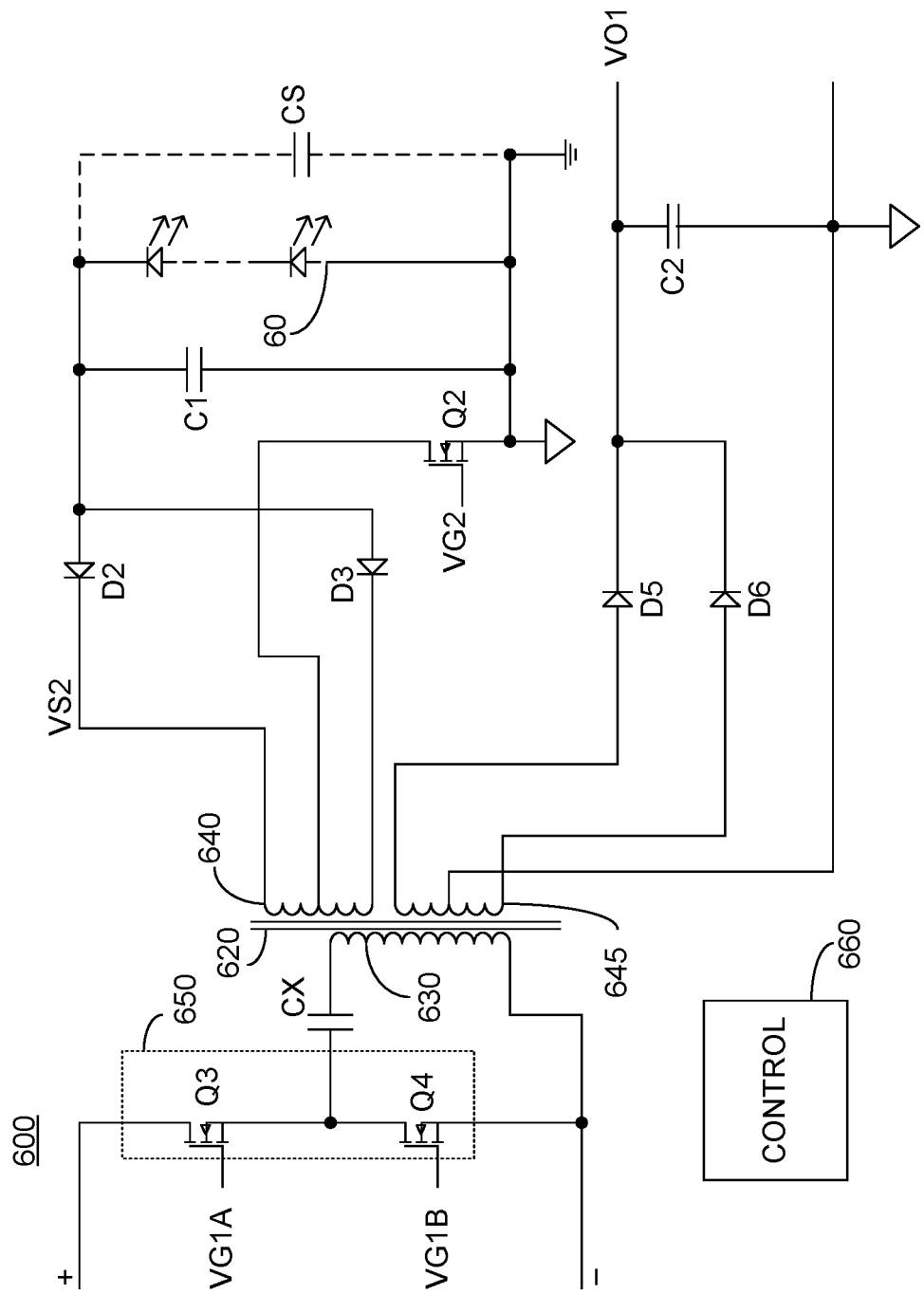
FIG. 7A illustrates a high level schematic diagram of an LED driving arrangement for a single LED string with an LLC half bridge arrangement on the primary side and a synchronously driven NFET inserted between chassis ground and one winding end of the driving transformer secondary, according to certain embodiments.

FIG. 7A illustrates a high level schematic diagram of an LED driving arrangement 600, according to certain embodiments. LED driving arrangement 600 comprises: an inductance element 620, illustrated and described herein as a transformer 620 and comprising a primary winding 630, a first secondary winding 640 and a second secondary winding 645, each magnetically coupled to primary winding 630; a switching circuit 650, switching circuit 650 comprising an NFET Q3 and an NFET Q4; a capacitor CX; a diode D2; a diode D3; a capacitor C1; an NFET Q2; an LED string 60; a unidirectional electronic valve D5, illustrated and described herein as a diode D5; a unidirectional electronic valve D6, illustrated and described herein as a diode D6; a capacitor C2; and a control circuitry 660.

The drain of NFET Q3 is coupled to a power lead and the gate of NFET Q3 is coupled to a respective output of control circuitry 660 (the connection not shown), the signal at the gate of NFET Q3 denoted VG1A. The source of NFET Q3 is coupled to the drain of NFET Q4 and a first end of capacitor CX. A second end of capacitor CX is coupled to a first end of primary winding 630. A second end of primary winding 630 is coupled to the source of NFET Q4 and a return lead. The gate of NFET Q4 is coupled to a respective output of control circuitry 660 (the connection not shown), the signal at the gate of NFET Q4 denoted VG1B.

A first end of first secondary winding 640 is coupled to the cathode of diode D2 and a second end of first secondary winding 640 is coupled to the cathode of diode D3. The anodes of diode D2 and diode D3 are commonly coupled to the first end of capacitor C1 and the cathode end of LED string 60. The second end of capacitor C1 and the anode end of LED string 60 are each coupled to a common potential, the common potential further coupled to a metal chassis. A center tap of first secondary winding 640 is coupled to the drain of NFET Q2 and the source of NFET Q2 is coupled to the common potential. The gate of NFET Q2 is coupled to a respective output of control circuitry 660 (connection not shown), the signal at the gate of NFET Q2 denoted VG2. Parasitic capacitance CS is further illustrated, between the cathode end of LED string 60 and the metal chassis, as described above.

A first end of second secondary winding 645 is coupled to the anode of diode D5 and a second end of second secondary winding 645 is coupled to the anode of diode D6. The cathodes of diodes D5 and D6 are commonly coupled to a first end of capacitor C2, and to an output node denoted VO1. A second end of capacitor C2 and a center tap of second secondary winding 645 are each coupled to the common potential.

Figure 7B:
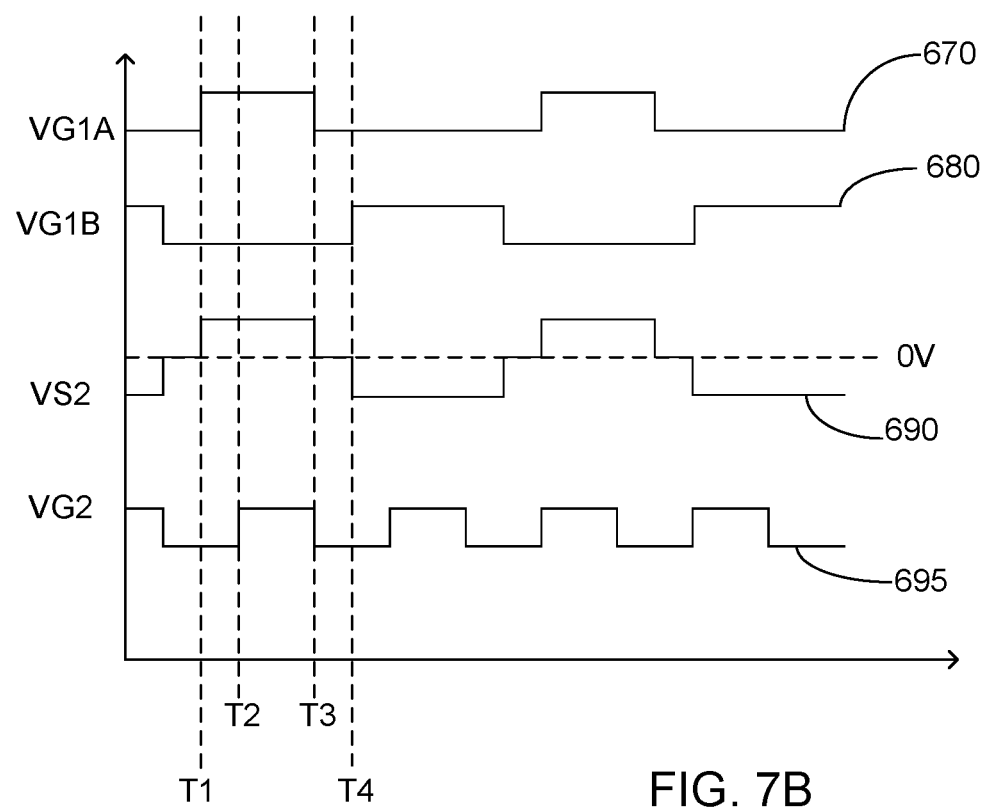
FIG. 7B illustrates various waveforms of the operation of the LED driving arrangement of FIG. 7A.

The operation of LED driving arrangement 600 will be described herein in relation to the waveform graphs of FIG. 7B where the x-axis represents time and the y-axis represents amplitude in arbitrary units. Particularly, signal VG1A is illustrated by trace 670, signal VG1B is illustrated by trace 680, voltage VS2 is illustrated by trace 690 and signal VG2 is illustrated by trace 695.

At time T1, control circuitry 660 is arranged to output a high signal VG1A and a low signal VG1B, thereby closing NFET Q3 and opening NFET Q4. As a result, primary winding 630 is charged and voltage VS2 rises. At time T2, control circuitry 660 is arranged to output a high signal VG2, thereby closing NFET Q2 and allowing current to flow through LED string 60 via diode D3.

The parasitic capacitance CS is shunted in parallel with LED string 60 and capacitor C1. Thus, when NFET Q2 is turned on, the currents flowing through LED string 60, capacitor C1 and parasitic capacitance CS are merged at the source of NFET Q2. These currents, including the current through parasitic capacitance CS all flow through NFET Q2 and first secondary winding 640. Because of the existence of first secondary winding 640 of transformer 620 in the current flowing loop, the dI/dt of these currents are all limited by the inductance of first secondary winding 640. Thus, with the dI/dt limiting function provided by the winding inductance, the sharp discharging current spike of parasitic capacitance CS is effectively eliminated.

At time T3, control circuitry 660 is arranged to output a low signal VG1A, thereby opening NFET Q3 and causing voltage VS2 to fall to zero. Additionally, control circuitry 660 is arranged to output a low signal VG2, thereby opening NFET Q2. Synchronizing the turn off edge of NFET Q2 with the zero value of voltage VS2 minimizes the turn off loss of NFET Q2. In fact, voltage VS2 stays at zero during the dead time period between T3 and T4, and the turn off edge of NFET Q2 can be deployed at any time point between T3 and T4. The current of LED string 60 is regulated by the on time of NFET Q2 between T2 and T3. At time T4, control circuitry 660 is arranged to output a high signal VG1B, thereby closing NFET Q4 and causing voltage VS2 to become negative, which will allow the second half of the cycle through diode D2, which for brevity will not be detailed.

Figure 8A:
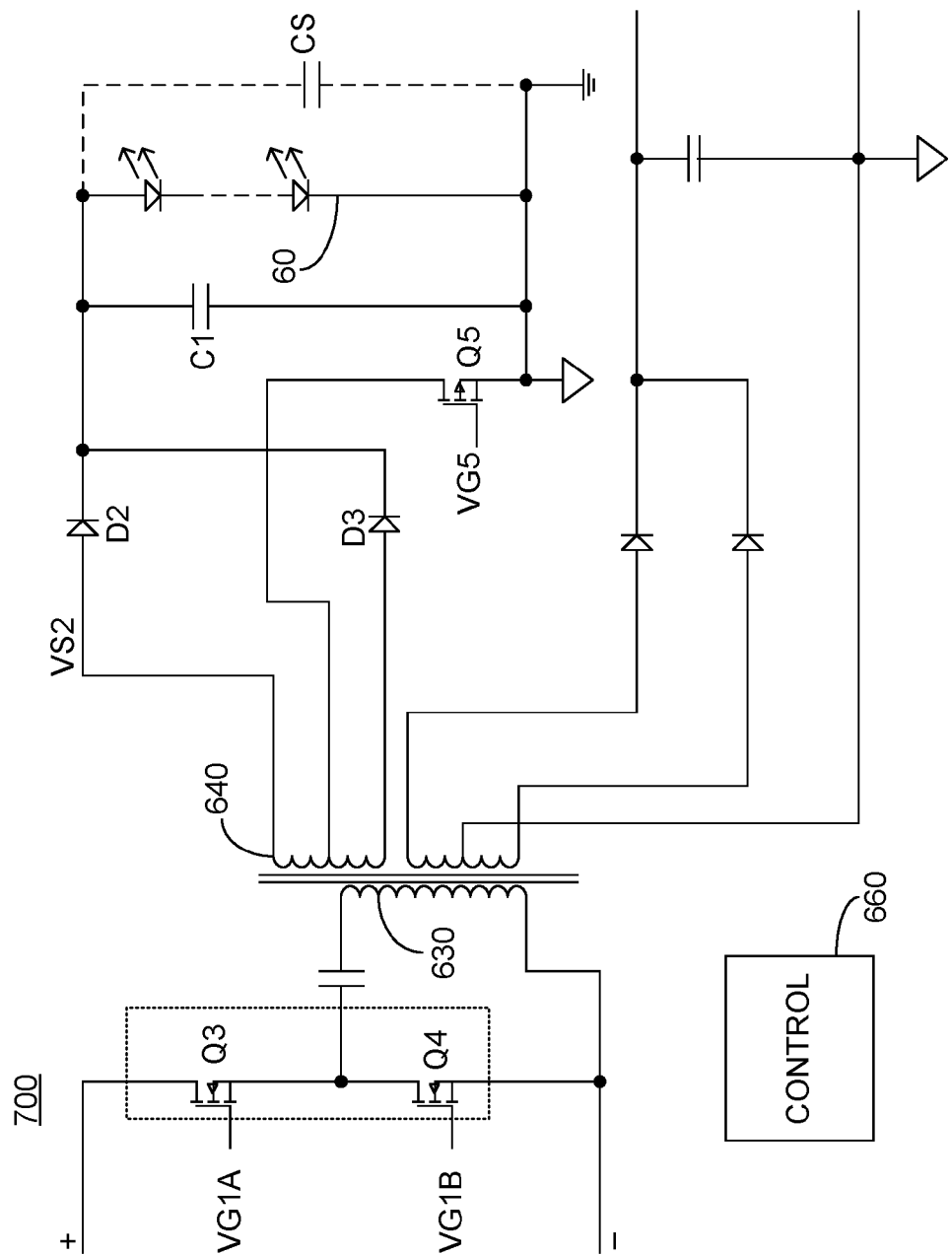
FIG. 8A illustrates a high level schematic diagram of an LED driving arrangement for a single LED string with an LLC half bridge arrangement on the primary side and a synchronously driven PFET inserted between chassis ground and a center tap of the driving transformer secondary, according to certain embodiments.

FIG. 8A illustrates a high level schematic diagram of an LED driving arrangement 700, according to certain embodiments. LED driving arrangement 700 is in all respects similar to LED driving arrangement 600, with the exception that NFET Q2 is replaced with a PFET Q5. Additionally, the polarities of diodes D2, D3 and LED string 60 are reversed. Particularly, the first end of first secondary winding 640 is coupled to the anode of diode D2 and the second end of first secondary winding 640 is coupled to the anode of diode D3. The cathodes of diodes D2 and D3 are commonly coupled to the first end of capacitor C1 and the anode end of LED string 60. The center tap of first secondary winding 640 is coupled to the drain of PFET Q5 and the source of PFET Q5 is coupled to the common potential. Additionally, the second end of capacitor C1 and the cathode end of LED string 60 are each coupled to the common potential. The gate of PFET Q5 is coupled to a respective output of control circuitry 660 (connection not shown), the signal at the gate of PFET Q5 denoted VG5.

Figure 8B:
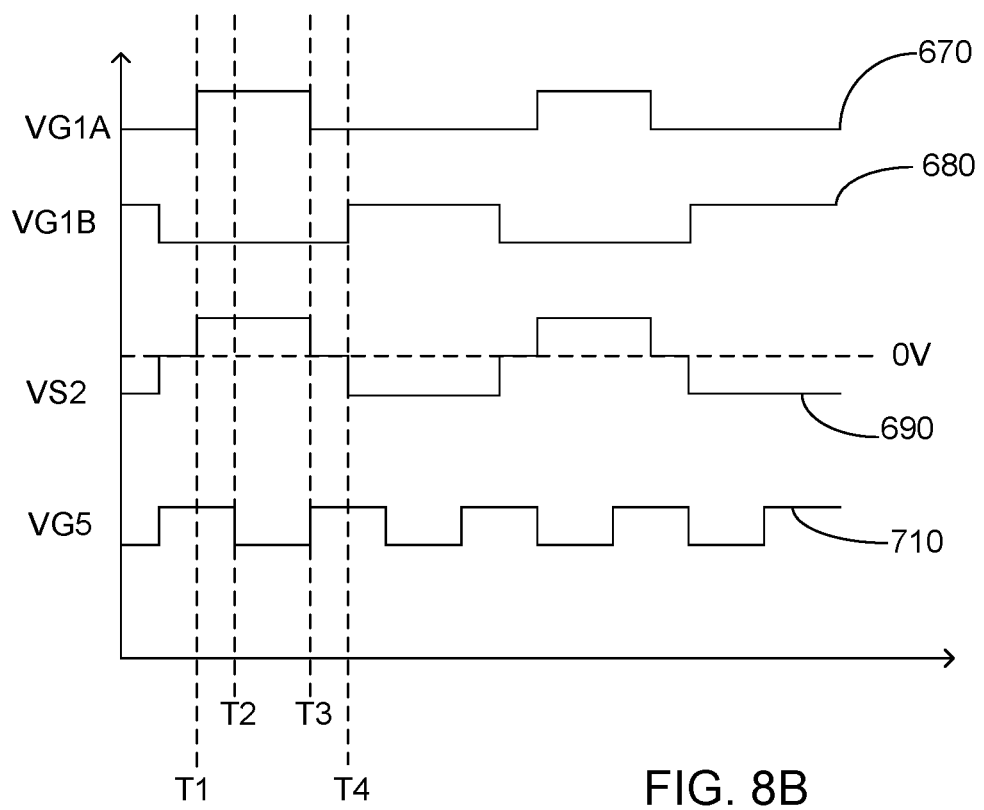
FIG. 8B illustrates various waveforms of the operation of the LED driving arrangement of FIG. 8A.

The operation of LED driving arrangement 700 will be described herein in relation to the waveform graphs of FIG. 8B where the x-axis represents time and the y-axis represents amplitude in arbitrary units. Particularly, signal VG1A is illustrated by trace 670, signal VG1B is illustrated by trace 680, voltage VS2 is illustrated by trace 690 and signal VG5 is illustrated by trace 710.

At time T1, control circuitry 660 is arranged to output a high signal VG1A and a low signal VG1B, thereby closing NFET Q3 and opening NFET Q4. As a result, primary winding 630 is charged and voltage VS2 rises. At time T2, control circuitry 660 is arranged to output a low signal VG5, thereby closing PFET Q5 and allowing current to flow through LED string 60 via diode D2.

The parasitic capacitance CS is shunted in parallel with LED string 60 and capacitor C1. Thus, when PFET Q5 is turned on, the currents flowing through LED string 60, capacitor C1 and parasitic capacitance CS are merged at the source of PFET Q5. These currents, including the current through parasitic capacitance CS all flow through PFET Q5 and first secondary winding 640. Because of the existence of first secondary winding 640 of transformer 620 in the current flowing loop, the dI/dt of these currents are all limited by the leakage inductance of first secondary winding 640. Thus, with the dI/dt limiting function by the winding leakage inductance, the sharp discharging current spike of parasitic capacitance CS is effectively eliminated.

At time T3, control circuitry 660 is arranged to output a low signal VG1A, thereby opening NFET Q3 and causing voltage VS2 to fall to zero. Additionally, control circuitry 660 is arranged to output a high signal VG5, thereby opening NFET Q2. Synchronizing the turn off edge of PFET Q5 with the zero value of voltage VS2 minimizes the turn off loss of PFET Q5. At time T4, control circuitry 660 is arranged to output a high signal VG1B, thereby closing NFET Q4 and causing voltage VS2 to become negative, which will allow the second half of the cycle through diode D3, which for brevity will not be detailed.

Figure 9A:
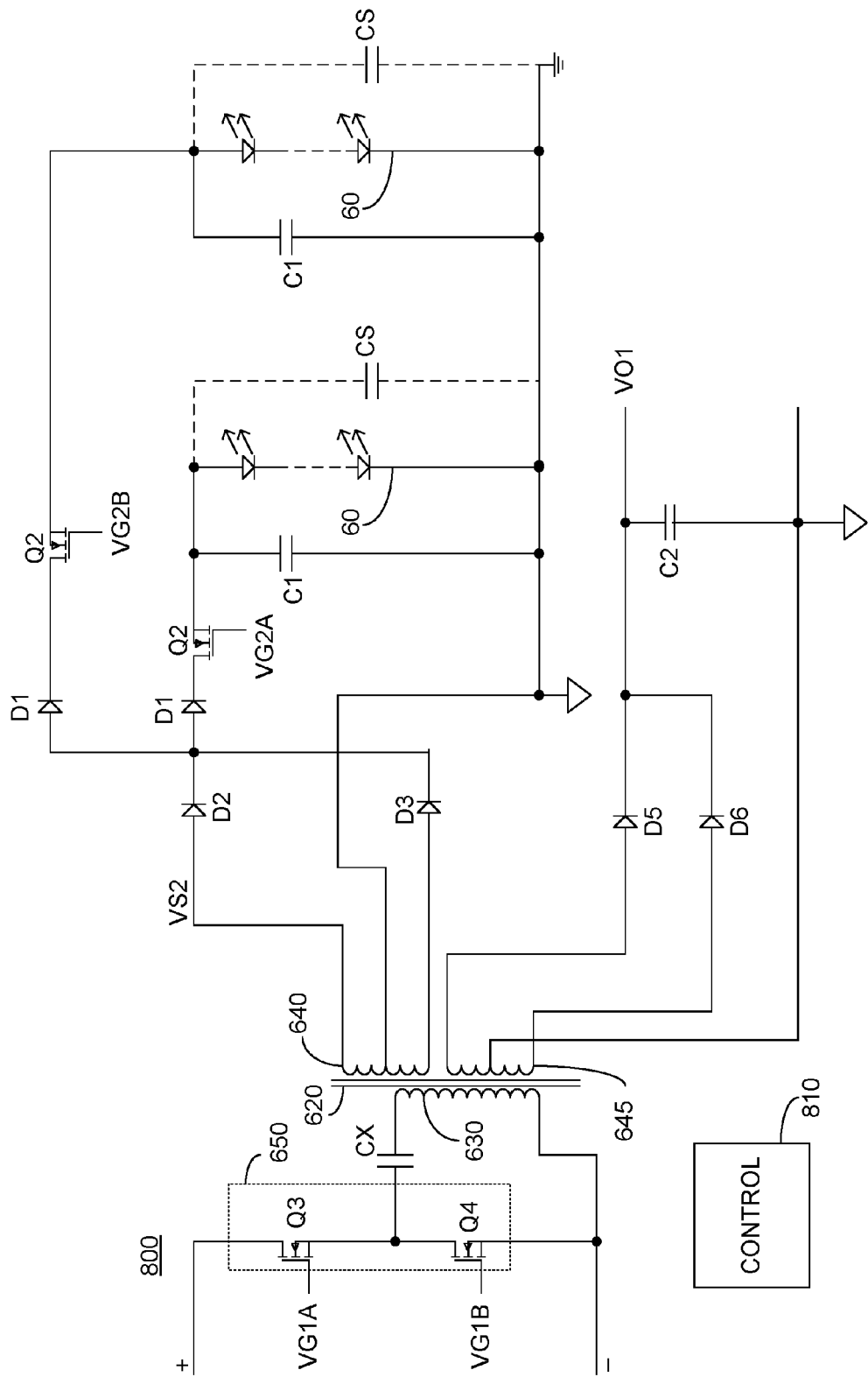
FIG. 9A illustrates a high level schematic diagram of an LED driving arrangement for multiple LED strings with an LLC half bridge arrangement on the primary side, where a respective synchronously driven NFET is inserted between a respective winding end of the driving transformer secondary and the anode end of the respective LED string.

FIG. 9A illustrates a high level schematic diagram of an LED driving arrangement 800. LED driving arrangement 800 comprises: a transformer 620 comprising a primary winding 630, a first secondary winding 640 and a second secondary winding 645, each magnetically coupled to primary winding 630; a switching circuit 650, switching circuit 650 comprising an NFET Q3 and an NFET Q4; a capacitor CX; a pair of diodes D1; a diode D2; a diode D3; a capacitor C1; a pair of NFETs Q2; a pair of LED strings 60; a diode D5; a diode D6; a capacitor C2; and a control circuitry 810.

The drain of NFET Q3 is coupled to a power lead and the gate of NFET Q3 is coupled to a respective output of control circuitry 810 (the connection not shown), the signal at the gate of NFET Q3 denoted VG1A. The source of NFET Q3 is coupled to the drain of NFET Q4 and a first end of capacitor CX. A second end of capacitor CX is coupled to a first end of primary winding 630. A second end of primary winding 630 is coupled to the source of NFET Q4 and a return lead. The gate of NFET Q4 is coupled to a respective output of control circuitry 810 (the connection not shown), the signal at the gate of NFET Q4 denoted VG1B.

A first end of first secondary winding 640 is coupled to the anode of diode D2 and a second end of first secondary winding 640 is coupled to the anode of diode D3. The cathodes of diode D2 and diode D3 are commonly coupled to the anodes of diodes D1. The cathode of each diode D1 is coupled to the drain of the respective NFET Q2. The gate of a first NFET Q2 is coupled to a respective output of control circuitry 810 (connection not shown), the signal at the gate of NFET Q2 denoted VG2A, and the gate of a second NFET Q2 is coupled to a respective output of control circuitry 810 (connection not shown), the signal at the gate of NFET Q3 denoted VG2B. The source of each NFET Q2 is coupled to a first end of a respective capacitor C1 and the anode end of a respective LED string 60. A second end of each capacitor C1 and the cathode end of each LED string 60 are each coupled to a common potential, which is further connected to a metal chassis. A center tap of first primary winding 640 is coupled to the common potential. The parasitic capacitance CS of each LED string 60 is further illustrated, between the anode end of the respective LED string 60 and the metal chassis, as described above.

A first end of second secondary winding 645 is coupled to the anode of diode D5 and a second end of second secondary winding 645 is coupled to the anode of diode D6. The cathodes of diodes D5 and D6 are commonly coupled to a first end of capacitor C2, and an output node denoted VO1. A second end of capacitor C2 and a center tap of second secondary winding 645 are each coupled to the common potential.

Figure 9B:
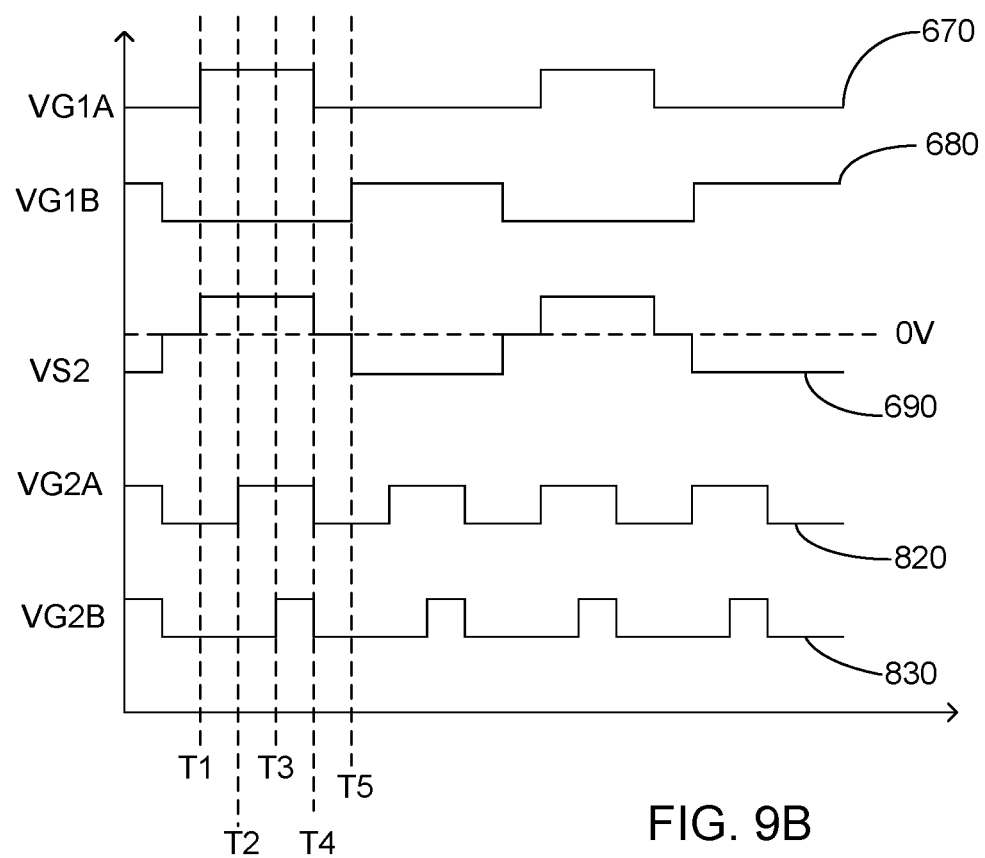
FIG. 9B illustrates various waveforms of the operation of the LED driving arrangement of FIG. 9A.

The operation of LED driving arrangement 800 will be described herein in relation to the waveform graphs of FIG. 9B where the x-axis represents time and the y-axis represents amplitude in arbitrary units. Particularly, signal VG1A is illustrated by trace 670, signal VG1B is illustrated by trace 680, voltage VS2 is illustrated by trace 690, signal VG2A is illustrated by trace 820 and signal VG2B is illustrated by trace 830.

At time T1, control circuitry 810 is arranged to output a high signal VG1A and a low signal VG1B, thereby closing NFET Q3 and opening NFET Q4. As a result, primary winding 630 is charged and voltage VS2 rises. At time T2, control circuitry 810 is arranged to output a high signal VG2A, thereby closing the respective NFET Q2 and generating current through the respective LED string 60. At time T3, control circuitry 810 is arranged to output a high signal VG2B, thereby closing the respective NFET Q2 and generating current through the respective LED string 60. As described above, the current through each parasitic capacitance CS flows through first secondary winding 640, the dI/dt limiting function of first secondary winding 640 effectively eliminating the sharp discharging current spike of parasitic capacitances CS.

At time T4, control circuitry 810 is arranged to output a low signal VG1A, thereby opening NFET Q3. As a result, voltage VS2 drops to zero. Additionally, control circuitry 810 is arranged to output low signals VG2A and VG2B, thereby opening NFETs Q2. Synchronizing the turn off edge of NFETs Q2 with the zero value of voltage VS2 minimizes the turn off loss of NFETs Q2.

At time T5, control circuitry 810 is arranged to output a high signal VG1B, thereby closing NFET Q4. As a result, voltage VS2 is negative and diode D3 is forward biased, which begins the second half of the cycle where current flows through diode D3, which in the interest of brevity will not be detailed.

At time T1, power is also output by second secondary winding 645 to output VO1. In one embodiment (now shown), a feedback loop is provided to control the duty cycle of NFET Q1 so as to maintain the voltage of output VO1 at a predetermined value.

Figure 10A:
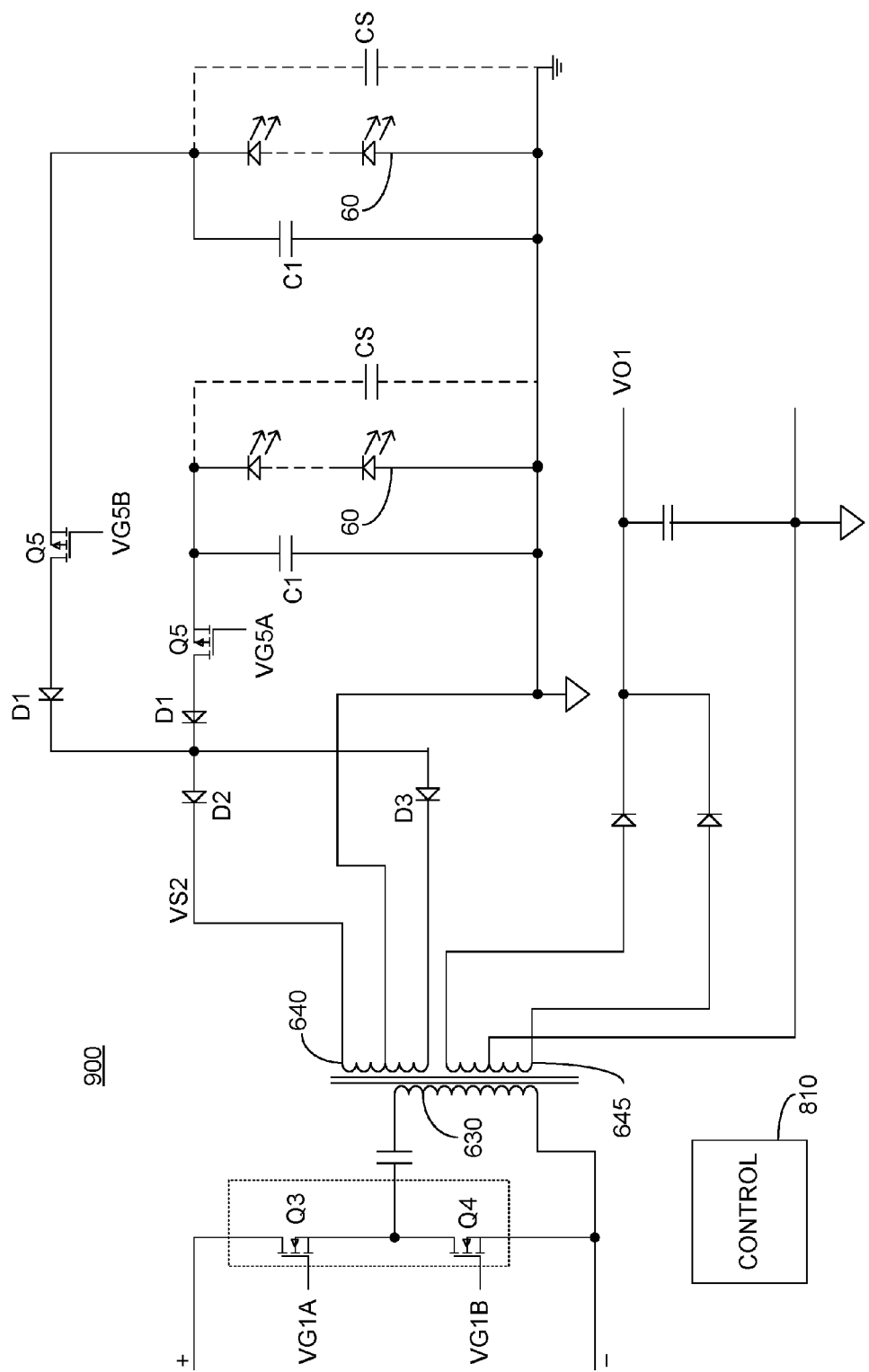
FIG. 10A illustrates a high level schematic diagram of an LED driving arrangement for multiple LED strings with an LLC half bridge arrangement on the primary side, where a respective synchronously driven PFET is inserted between a respective winding end of the driving transformer secondary and the anode end of the respective LED string, according to certain embodiments.

FIG. 10A illustrates a high level schematic diagram of an LED driving arrangement 900, according to certain embodiments. LED driving arrangement 900 is in all respects similar to LED driving arrangement 800, with the exception that NFETs Q2 are replaced with a pair of PFETs Q5. Additionally, the polarity of diodes D1, D2 and D3 are reversed, as is the polarity of LED strings 60. Particularly, the first end of first secondary winding 640 is coupled to the cathode of diode D2 and the second end of first secondary winding 640 is coupled to the cathode of diode D3. The anodes of diodes D2 and D3 are commonly coupled to the cathodes of both diodes D1. The anode of each diode D1 is coupled to the drain of a respective PFET Q5. The gate of each PFET Q5 is coupled to a respective output of control circuitry 810 (the connections not shown) and the signal on the gate is denoted VG5A and VG5B, respectively. The source of each PFET Q5 is coupled to the first end of the respective capacitor C1 and the cathode end of the respective LED string 60. The anode end of each LED string 60 is coupled to the common potential. The second end of each capacitor C1 and the center tap of first primary winding 640 are each coupled to the common potential.

Figure 10B:
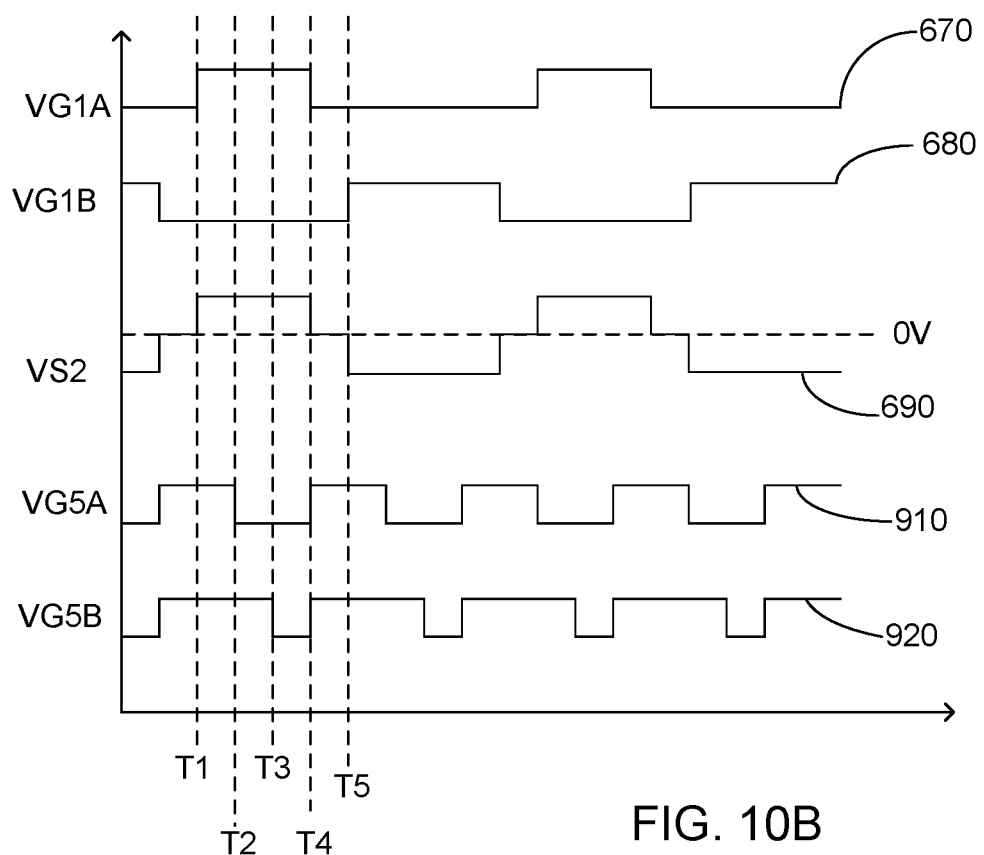
FIG. 10B illustrates various waveforms of the operation of the LED driving arrangement of FIG. 10A.

The operation of LED driving arrangement 900 will be described herein in relation to the waveform graphs of FIG. 10B where the x-axis represents time and the y-axis represents amplitude in arbitrary units. Particularly, signal VG1A is illustrated by trace 670, signal VG1B is illustrated by trace 680, voltage VS2 is illustrated by trace 690, signal VG5A is illustrated by trace 910 and signal VG5B is illustrated by trace 920.

At time T1, control circuitry 810 is arranged to output a high signal VG1A and a low signal VG1B, thereby closing NFET Q3 and opening NFET Q4. As a result, primary winding 630 is charged and voltage VS2 rises. At time T2, control circuitry 810 is arranged to output a low signal VG5A, thereby closing the respective PFET Q5 and generating current through the respective LED string 60. At time T3, control circuitry 810 is arranged to output a low signal VG5B, thereby closing the respective PFET Q5 and generating current through the respective LED string 60. As described above, the current through each parasitic capacitance CS flows through first secondary winding 640, the dI/dt limiting function of first secondary winding 640 effectively eliminating the sharp discharging current spike of parasitic capacitances CS.

At time T4, control circuitry 810 is arranged to output a low signal VG1A, thereby opening NFET Q3. As a result, voltage VS2 drops to zero. Additionally, control circuitry 810 is arranged to output high signals VG5A and VG5B, thereby opening PFETs Q5. Synchronizing the turn off edge of PFETs Q5 with the zero value of voltage VS2 minimizes the turn off loss of PFETs Q5.

At time T5, control circuitry 810 is arranged to output a high signal VG1B, thereby closing NFET Q4. As a result, voltage VS2 is negative and diode D2 is forward biased, which begins the second half of the cycle where current flows through diode D3, which in the interest of brevity will not be detailed At time T1, power is also output by second secondary winding 645 to output VO1. In one embodiment (now shown), a feedback loop is provided to control the duty cycle of NFET Q1 so as to maintain the voltage of output VO1 at a predetermined value.

Figure 11A:
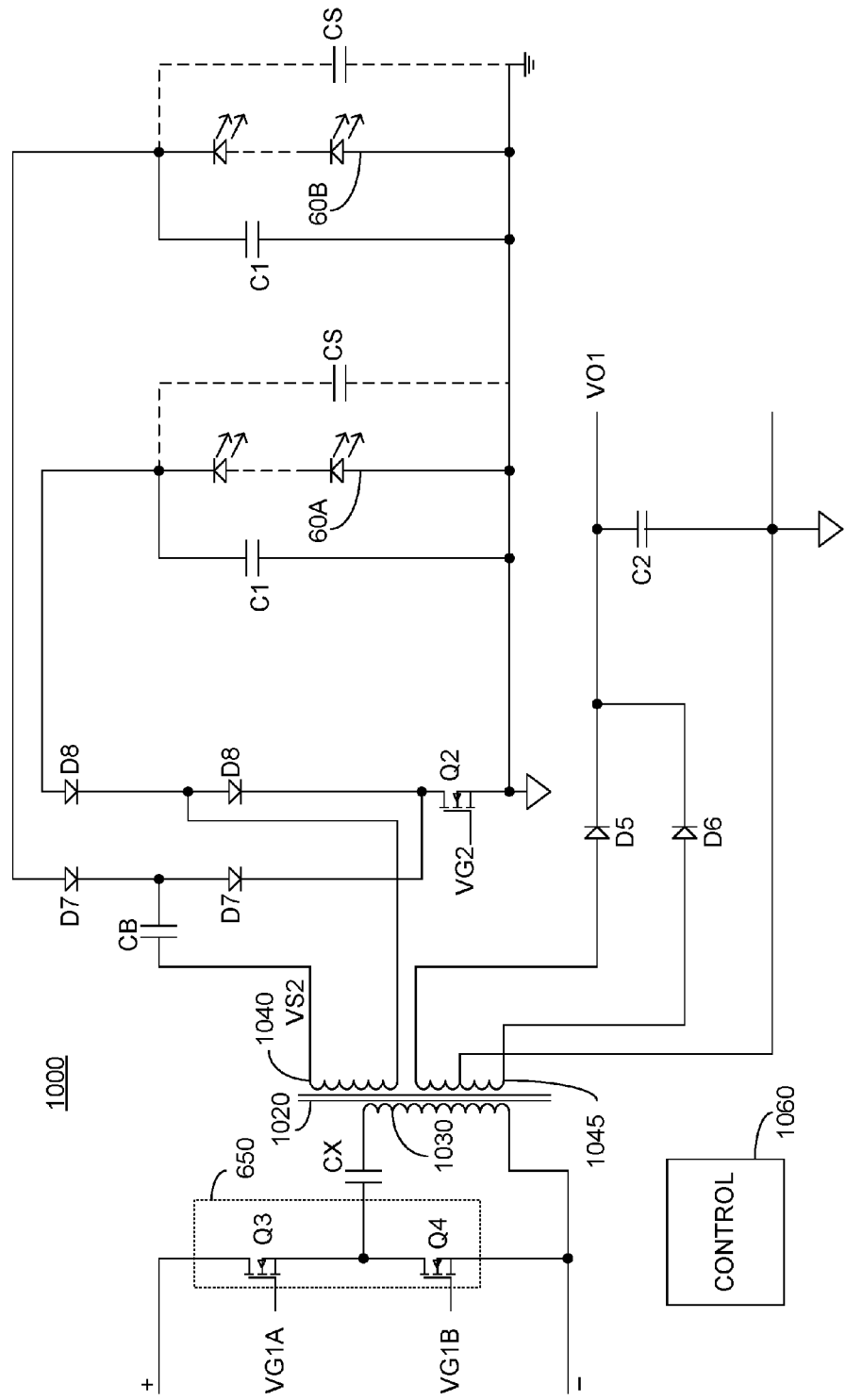
FIG. 11A illustrates a high level schematic diagram of an LED driving arrangement for multiple LED strings with an LLC half bridge arrangement on the primary side, where a respective synchronously driven NFET is inserted between a respective winding end of the driving transformer secondary and the anode end of the respective LED string, according to certain embodiments.

FIG. 11A illustrates a high level schematic diagram of an LED driving arrangement 1000. LED driving arrangement 1000 comprises: an inductance element 1020, illustrated and described herein as a transformer 1020 comprising a primary winding 1030, a first secondary winding 1040 and a second secondary winding 1045, each magnetically coupled to primary winding 1030; a switching circuit 650, switching circuit 650 comprising an NFET Q3 and an NFET Q4; a capacitor CX; a diode D5; a diode D6; a pair of unidirectional electronic valves D7, illustrated and described herein as diodes D7; a pair of unidirectional electronic valves D8, illustrated and described herein as diodes D8; a pair of capacitors C1; a capacitance element CB, illustrated and described herein as a capacitor CB; an NFET Q2; a pair of LED strings 60A and 60B; a capacitor C2; and a control circuitry 1060.

The drain of NFET Q3 is coupled to a power lead and the gate of NFET Q3 is coupled to a respective output of control circuitry 1060 (the connection not shown), the signal on the gate of NFET Q3 denoted VG1A. The source of NFET Q3 is coupled to the drain of NFET Q4 and a first end of capacitor CX. A second end of capacitor CX is coupled to a first end of primary winding 630. A second end of primary winding 630 is coupled to the source of NFET Q4 and a return lead. The gate of NFET Q4 is coupled to a respective output of control circuitry 1060 (the connection not shown), the signal on the gate of NFET Q4 denoted VG1B.

A first end of first secondary winding 1040 is coupled to a first end of capacitor CB. A second end of capacitor CB is coupled to the cathode of a first diode D7 and to the anode of the second diode D7. The anode of the first diode D7 is coupled to the cathode end of LED string 60B and a first end of a respective capacitor C1. A second end of first secondary winding 1040 is coupled to the cathode of a first diode D8 and the anode of the second diode D8. The anode of the first diode D8 is coupled to the cathode end of LED string 60A and a first end of a respective capacitor C1. The cathodes of the second diode D7 and the second diode D8 are commonly coupled to the drain of NFET Q2. The gate of NFET Q2 is coupled to a respective output of control circuitry 1060 (the connection not shown), the signal on the gate of NFET Q2 denoted VG2. The source of NFET Q2, the second end of each capacitor C1 and the anode end of each LED string 60A, 60B are each coupled to a common potential, the common potential further coupled to a metal chassis. Further illustrated is the parasitic capacitance CS of each LED string, from the cathode end of the respective LED string to the metal chassis, as described above.

A first end of second secondary winding 1045 is coupled to the anode of diode D5 and a second end of second secondary winding 1045 is coupled to the anode of diode D6. The cathodes of diodes D5 and D6 are commonly coupled to a first end of capacitor C2, representing an output node denoted VO1. A second end of capacitor C2 and a center tap of second secondary winding 645 are each coupled to the common potential.

Figure 11B:
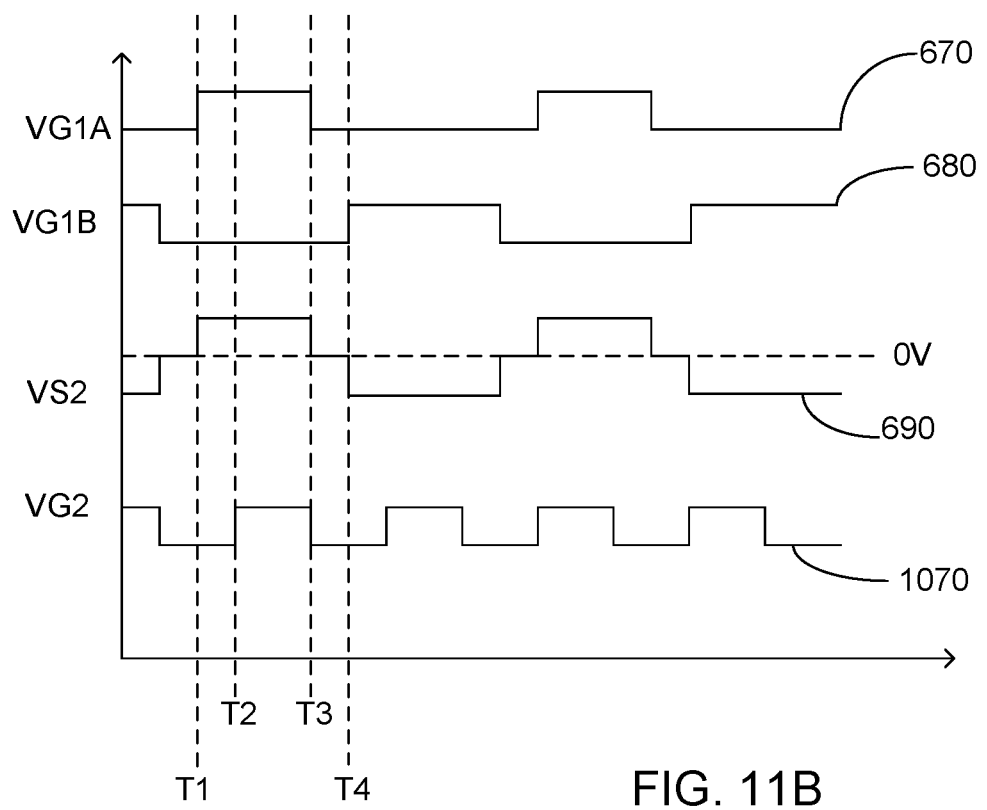
FIG. 11B illustrates various waveforms of the operation of the LED driving arrangement of FIG. 11A.

The operation of LED driving arrangement 1000 will be described herein in relation to the waveform graph of FIG. 11B where the x-axis represents time and the y-axis represents amplitude in arbitrary units. Particularly, signal VG1A is illustrated by trace 670, signal VG1B is illustrated by trace 680, voltage VS2 is illustrated by trace 690 and signal VG2 is illustrated by trace 1070.

At time T1, control circuitry 1060 is arranged to output a high signal VG1A and a low signal VG1B, thereby closing NFET Q3 and opening NFET Q4. As a result, primary winding 1030 is charged and voltage VS2 rises. At time T2, control circuitry 1060 is arranged to output a high signal VG2, thereby closing NFET Q2 and generating current through LED strings 60A and 60B. Capacitor CB balances the currents of LED strings 60A and 60B, and ensures that the currents are equal. As shown, balancing capacitor CB is in the AC current flowing path, i.e. during the positive half cycle of voltage VS2 the current of LED string 60A flows through NFET Q2 and then capacitor CB from left side to right side, while during the negative half cycle of voltage VS2 the current of LED string 60B flows through NFET Q2 and then capacitor CB from right side to left side. A capacitor can only couple AC current at steady state, or in other words, the voltage across a capacitor can only be maintained unchanged when the positive charge and negative charge are equal. With this natural property of the capacitor, the current of the two LED strings 60A and 60B will automatically be maintained equal at steady state operation. If the forward operating voltages of LED strings 60A and 60B are not equal, a DC bias voltage will be automatically established across capacitor CB. For example, in the event that the forward operating voltage of LED string 60A is greater than the forward operating voltage of LED string 60B, the DC bias voltage will exhibit a polarity of positive on the right side of capacitor CB, and the amplitude will be:

$$(\tfrac{1}{2})*(V_{LED1} - V_{LED2}) \quad \text{EQ. 1}$$

where VLED1 is the forward operating voltage of LED string 60A and VLED2 is the forward operating voltage of LED string 60B.

The DC bias voltage causes an increase in the voltage across LED string 60A and a decrease in the voltage across LED string 60B so as to maintain the balance of the current of the two LED strings 60A and 60B.

As described above, for each LED string 60A and 60B, the current thereof flows through NFET Q2 and capacitor CB, via first secondary winding 1040. Thus, the effect of the parasitic capacitance CS on the switching operation is eliminated.

At time T3, control circuitry 1060 is arranged to output a low signal VG1A, thereby opening NFET Q3. As a result, voltage VS2 drops to zero. Additionally, control circuitry 1060 is arranged to output a low signal VG2, thereby opening NFET Q2. Synchronizing the turn off edge of NFET Q2 with the zero value of voltage VS2 minimizes the turn off loss of NFET Q2.

At time T4, control circuitry 1060 is arranged to output a high signal VG1B, thereby closing NFET Q4. As a result, voltage VS2 is negative and current flows through LED string 60B, which begins the second half of the cycle where current flows through the respective diodes D7, D8 which in the interest of brevity will not be detailed.

At time T1, power is also output by second secondary winding 1045 to output VO1. In one embodiment (now shown), a feedback loop is provided to control the duty cycle of NFET Q1 so as to maintain the voltage of output VO1 at a predetermined value.

Figure 12A:
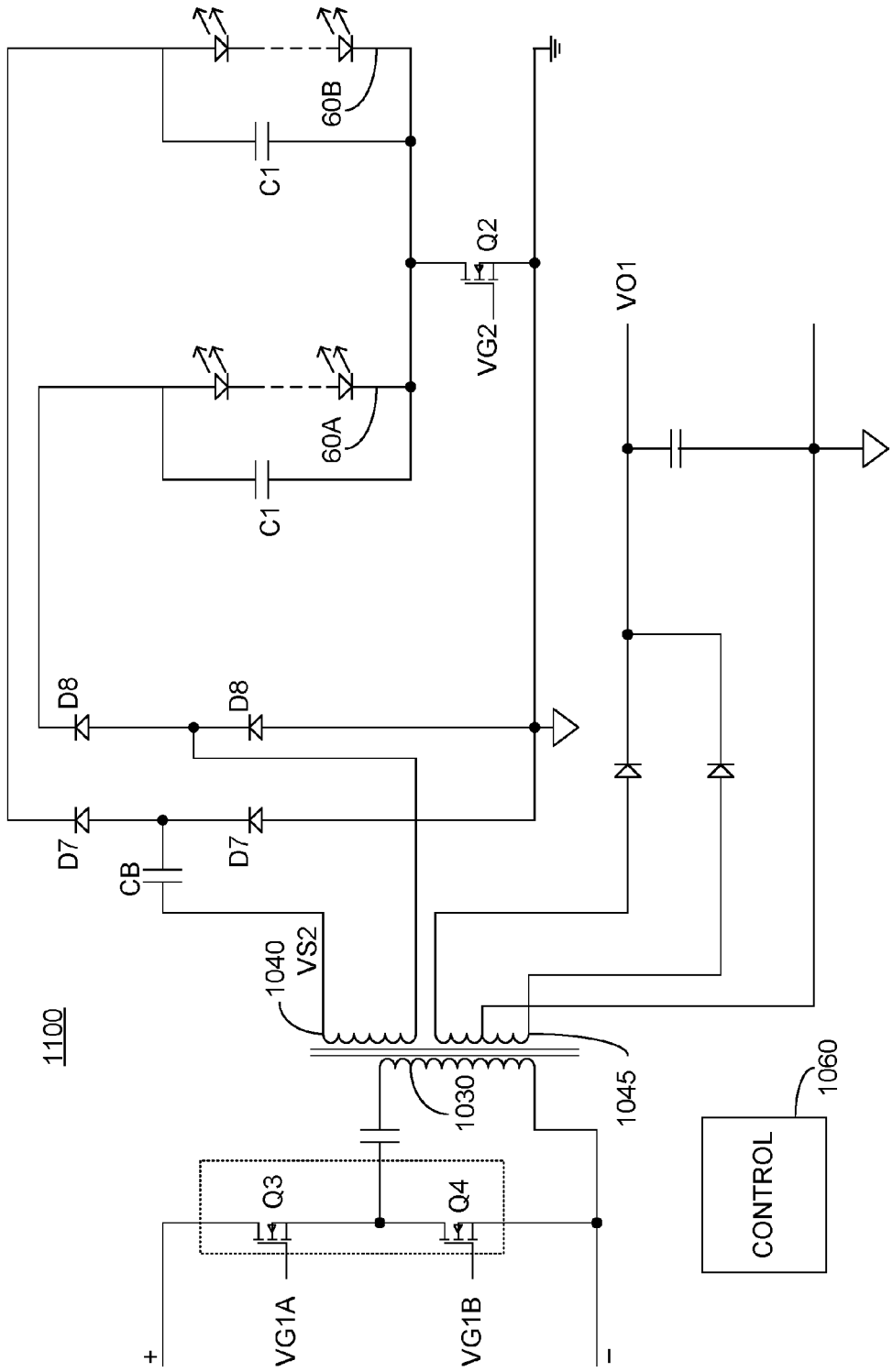
FIG. 12A illustrates a high level schematic diagram of an LED driving arrangement for multiple LED strings with an LLC half bridge arrangement on the primary side, where a respective synchronously driven NFET is inserted between a common potential and the cathode end of the respective LED string, according to certain embodiments.

FIG. 12A illustrates a high level schematic diagram of a LED driving arrangement 1100. LED driving arrangement 1100 is in all respects similar to LED driving arrangement 1000, with the exception that NFET Q2 is coupled between LED strings 60A, 60B and the common potential. Additionally, the polarity of diodes D7, diodes D8 and LED string 60A, 60B are reversed. Particularly, the second end of capacitor CB is coupled to the anode of the first diode D7 and the cathode of the second diode D7. The cathode of the first diode D7 is coupled to the anode end of LED string 60B and the first end of the respective capacitor C1. The second end of first secondary winding 1040 is coupled to the anode of a first diode D8 and the cathode of the second diode D8. The cathode of the first diode D8 is coupled to the anode end of LED string 60A and the first end of the respective capacitor C1. The anodes of the second diode D7 and the second diode D8 are coupled to the common potential. The gate of NFET Q2 is coupled to a respective output of control circuitry 1060 (the connection not shown), the signal on the gate of NFET Q2 denoted VG2. The second end of each capacitor C1 and the cathode end of each LED string 60A, 60B are commonly coupled to the drain of NFET Q2. The source of NFET Q2 is coupled to the common potential.

Figure 12B:
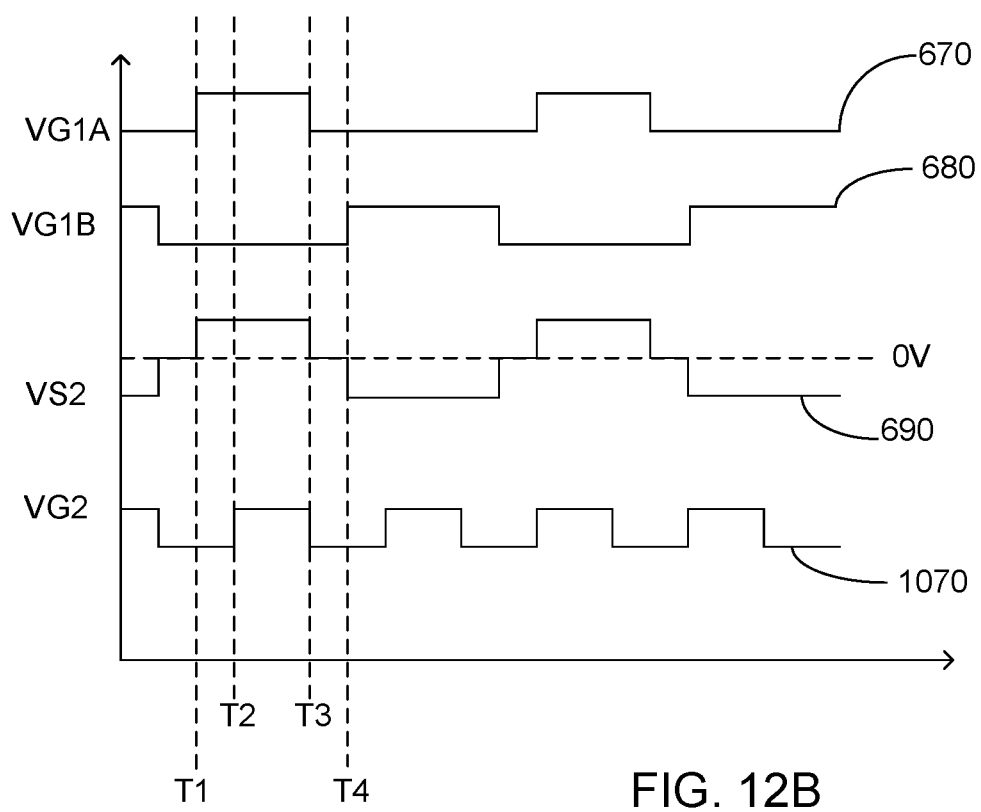
FIG. 12B illustrates various waveforms of the operation of the LED driving arrangement of FIG. 12A.

The operation of LED driving arrangement 1100 will be described herein in relation to the waveform graphs of FIG. 12B where the x-axis represents time and the y-axis represents amplitude in arbitrary units. Particularly, signal VG1A is illustrated by trace 670, signal VG1B is illustrated by trace 680, voltage VS2 is illustrated by trace 690 and signal VG2 is illustrated by trace 1070.

At time T1, control circuitry 1060 is arranged to output a high signal VG1A and a low signal VG1B, thereby closing NFET Q3 and opening NFET Q4. As a result, primary winding 1030 is charged and voltage VS2 rises. At time T2, control circuitry 1060 is arranged to output a high signal VG2, thereby closing NFET Q2 and generating current through LED strings 60A and 60B. Capacitor CB balances the currents of LED strings 60A and 60B, and ensures that the currents are equal, as described above in relation to LED driving arrangement 1000.

In applications where the LED drive ground is not connected to the chassis ground or the parasitic capacitance is small enough to not cause significant switching stress, the configuration of LED driving arrangement 1100 is also a viable solution for a low cost two string LED drive.

At time T3, control circuitry 1060 is arranged to output a low signal VG1A, thereby opening NFET Q3. As a result, voltage VS2 drops to zero. Additionally, control circuitry 1060 is arranged to output a low signal VG2, thereby opening NFET Q2. Synchronizing the turn off edge of NFET Q2 with the zero value of voltage VS2 minimizes the turn off loss of NFET Q2.

At time T4, control circuitry 1060 is arranged to output a high signal VG1B, thereby closing NFET Q4. As a result, voltage VS2 is negative and current flows through LED string 60B, as described above thus providing the second half of the cycle.

At time T1, power is also output by second secondary winding 1045 to output VO1. In one embodiment (now shown), a feedback loop is provided to control the duty cycle of NFET Q1 so as to maintain the voltage of output VO1 at a predetermined value.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A LED driving arrangement comprising:
   a control circuitry;
   an inductance element having a primary side and a secondary side;
   a switching circuit, said inductance element arranged, responsive to said switching circuit, to receive power at said primary side from a power source, and said inductance element further arranged, responsive to said received power at said primary side, to output at said secondary side a function of said received power;
   at least one light emitting diode (LED) based luminaire;
   a parasitic capacitance between the at least one LED based luminaire and a chassis; and
   an electronically controlled switch coupled between said secondary side of said inductance element and said at least one LED based luminaire,
   wherein said electronically controlled switch is arranged, responsive to said control circuitry, to alternately switch between an open state and a closed state, said at least one LED based luminaire arranged to receive said output power when said electronically controlled switch is in said closed state and not receive said output power when said electronically controlled switch is in said open state, and
   wherein said electronically controlled switch, said secondary side of said inductance element and a discharge path of said parasitic capacitance are coupled in series.

2. The LED driving arrangement of claim 1, further comprising a capacitance element coupled in parallel with said at least one LED based luminaire,
   wherein an end of said capacitance element and an end of said at least one LED base luminaire are each coupled to the chassis.

3. The LED driving arrangement of claim 1, wherein said inductance element comprises a transformer, said primary side comprising a primary winding and said secondary side comprising a secondary winding magnetically coupled to said primary winding, and
   wherein said electronically controlled switch is coupled in series with an end of said secondary winding thereby providing the discharge path.

4. The LED driving arrangement of claim 1, wherein said inductance element comprises a transformer, said primary side comprising a primary winding and said secondary side comprising a secondary winding magnetically coupled to said primary winding, and
   wherein said electronically controlled switch is coupled in series with a center tap of said first secondary winding thereby providing the discharge path.

5. The LED driving arrangement of claim 1, further comprising a plurality of unidirectional electronic valves,
   wherein said inductance element comprises a transformer, said primary side comprising a primary winding and said secondary side comprising a secondary winding magnetically coupled to said primary winding, wherein said at least one LED based luminaire comprises a pair of LED based luminaires, wherein said electronically controlled switch is coupled between said secondary winding and a first of said pair of LED based luminaires, via a first pair of said plurality of unidirectional electronic valves, and wherein said electronically controlled switch is coupled between said secondary winding and a second of said pair of LED based luminaires, via a second pair of said plurality of unidirectional electronic valves, said second pair different than said first pair thereby providing the discharge path.

6. The LED driving arrangement of claim 1, wherein said control circuitry is arranged to alternately switch said electronically controlled switch between said open state and said closed state in synchronization with said switching of said switching circuit.

7. An LED driving method comprising:
switching a switching circuit between a plurality of states;
providing power to a primary side of an inductance element responsive to a first state of the switching circuit;
not providing power to the primary side of the inductance element responsive to a second state of the switching circuit;
responsive to said received power at the primary side of the inductance element, outputting at a secondary side of the inductance element a function of said received power;
alternately switching an electronically controlled switch between a closed state and an open state;
responsive to said closed state of the electronically controlled switch, providing said power output from the secondary side of the inductance element to at least one light emitting diode (LED) based luminaire;
responsive to said open state of the electronically controlled switch, not providing said output power; and
providing a discharge path for a parasitic capacitance of the at least one LED based luminaire through the electronically controlled switch in said closed state and the secondary side of the inductance element coupled in series.

8. The method of claim 7, wherein the inductance element comprises a transformer, the primary side comprising a primary winding and the secondary side comprising a secondary winding magnetically coupled to the primary winding, and wherein the electronically controlled switch is connected to an end of the secondary winding of the transformer.

9. The method of claim 7, wherein the inductance element comprises a transformer, the primary side comprising a primary winding and the secondary side comprising a secondary winding magnetically coupled to the primary winding, and wherein the electronically controlled switch is connected to a center tap of the secondary winding of the transformer.

10. The method of claim 7, further comprising providing a capacitance element in parallel to the at least one LED based luminaire.

11. The method of claim 7, wherein the at least one LED based luminaire comprises a pair of LED based luminaires, wherein said provided discharge path comprises a current path from a first of the pair of LED based luminaires through a first pair of unidirectional electronic valves, the electronically controlled switch and the secondary side of the inductance element, and wherein said provided discharge path comprises a current path from a second of the pair of LED based luminaires through a second pair of unidirectional electronic valves, the electronically controlled switch and the secondary side of the inductance element, the second pair of unidirectional electronic valves different than the first pair of unidirectional electronic valves.

12. The method of claim 7, wherein said switching of the electronically controlled switch is in synchronization with said switching of the switching circuit.

* * * * *